United States Patent
Ichihara et al.

(10) Patent No.: US 12,416,833 B2
(45) Date of Patent: Sep. 16, 2025

(54) DISPLAY DEVICE

(71) Applicant: Japan Display Inc., Tokyo (JP)

(72) Inventors: Kazuki Ichihara, Tokyo (JP); Naoyuki Asano, Tokyo (JP); Motoki Tsuda, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 18/790,101

(22) Filed: Jul. 31, 2024

(65) Prior Publication Data
US 2024/0385481 A1    Nov. 21, 2024

Related U.S. Application Data

(63) Continuation of application No. PCT/JP2023/003181, filed on Feb. 1, 2023.

(30) Foreign Application Priority Data

Feb. 3, 2022  (JP) .................................. 2022-015975

(51) Int. Cl.
*G02F 1/1335*    (2006.01)
*F21V 8/00*      (2006.01)
*G02F 1/1334*    (2006.01)

(52) U.S. Cl.
CPC ..... *G02F 1/133616* (2021.01); *G02B 6/0028* (2013.01); *G02B 6/0068* (2013.01); *G02F 1/1334* (2013.01)

(58) Field of Classification Search
CPC ............. G02F 1/133616; G02F 1/1334; G02F 1/133615; G02F 1/1336; G02B 6/0028; G02B 6/0026; G09F 9/00
See application file for complete search history.

(56) References Cited

U.S. PATENT DOCUMENTS

2011/0149201 A1* 6/2011 Powell ............. G02F 1/133615
                                                            349/62
2018/0031758 A1    2/2018 Mizuno et al.
(Continued)

FOREIGN PATENT DOCUMENTS

| JP | 2018021974 A  | 2/2018  |
| JP | 2020122846 A  | 8/2020  |
| WO | 2020213415 A1 | 10/2020 |

OTHER PUBLICATIONS

International Search Report from corresponding International Patent Application No. PCT/JP2023/003181, mailed Apr. 18, 2023 and English translation of same. 5 pages.
(Continued)

*Primary Examiner* — Elmito Breval
*Assistant Examiner* — Jose M Diaz
(74) *Attorney, Agent, or Firm* — K&L Gates LLP

(57) ABSTRACT

According to an aspect, a display device includes: a display panel that includes a first light-transmitting substrate, a second light-transmitting substrate, and a liquid crystal layer between the first and second light-transmitting substrates, and has an active region capable of displaying images and peripheral regions outside the active region; a glass base member bonded to the display panel; and a light source disposed so that light enters a side surface of the first light-transmitting substrate, a side surface of the second light-transmitting substrate, or a side surface of the glass base member. The light source includes a light guide and light emitters. At least one of the light emitters is disposed in each of first regions that overlap regions obtained by extending the peripheral regions located on opposite sides of the active region.

10 Claims, 22 Drawing Sheets

(56) References Cited

U.S. PATENT DOCUMENTS

| | | |
|---|---|---|
| 2020/0150490 A1 | 5/2020 | Mizuno et al. |
| 2021/0116759 A1 | 4/2021 | Mizuno et al. |
| 2021/0341810 A1 | 11/2021 | Iwai et al. |
| 2021/0382363 A1 | 12/2021 | Iwai |
| 2022/0113593 A1 | 4/2022 | Mizuno et al. |
| 2023/0152631 A1 | 5/2023 | Mizuno et al. |

OTHER PUBLICATIONS

Office Action issued in related Japanese Patent Application No. 2023-578588, mailed on Nov. 5, 2024 and English translation of same. 7 pages.

* cited by examiner

DISPLAY DEVICE

CROSS-REFERENCE TO RELATED APPLICATION

This application claims the benefit of priority from Japanese Patent Application No. 2022-015975 filed on Feb. 3, 2022 and International Patent Application No. PCT/JP2023/003181 filed on Feb. 1, 2023, the entire contents of which are incorporated herein by reference.

BACKGROUND

1. Technical Field

What is disclosed herein relates to a display device.

2. Description of the Related Art

Japanese Patent Application Laid-open Publication No. 2018-021974 (JP-A-2018-021974) describes a display device that includes a first light-transmitting substrate, a second light-transmitting substrate disposed so as to face the first light-transmitting substrate, a liquid crystal layer including polymer-dispersed liquid crystals filled between the first and the second light-transmitting substrates, and at least one light emitter disposed so as to face at least one of side surfaces of the first and the second light-transmitting substrates.

In the display device described in JP-A-2018-021974, a viewer on one surface side of a display panel can view a background on the other surface side opposite to the one surface side. Unless a peripheral region outside a display region transmits light, the background cannot be seen, which may cause a sense of discomfort. Therefore, the peripheral region outside the display region preferably also allows the background on the other surface side opposite to the one surface side to be seen from the one surface side. When the peripheral region outside the display region is a see-through region, an unintended shadow starting from the peripheral region outside the display region may be visible when the display panel is seen in an oblique direction.

For the foregoing reasons, there is a need for a display device that restrains an unintended shadow starting from a peripheral region outside a display region from being visible when a display panel is seen in an oblique direction.

SUMMARY

According to an aspect, a display device includes: a display panel that includes a first light-transmitting substrate, a second light-transmitting substrate, and a liquid crystal layer between the first light-transmitting substrate and the second light-transmitting substrate, and has an active region capable of displaying images as viewed from a direction orthogonal to the first light-transmitting substrate and peripheral regions outside the active region; a light-transmitting glass base member bonded to the display panel; and a light source disposed so that light enters a side surface of the first light-transmitting substrate, a side surface of the second light-transmitting substrate, or a side surface of the glass base member. The light source includes a light guide provided along the side surface of the first light-transmitting substrate, the side surface of the second light-transmitting substrate, or the side surface of the glass base member and extending in a first direction, and a plurality of light emitters arranged so as to face the light guide. At least one of the light emitters is disposed in each of first regions that overlap regions obtained by extending, in a second direction intersecting the first direction, the peripheral regions located on opposite sides in the first direction of the active region.

DETAILED DESCRIPTION

Figure 1:
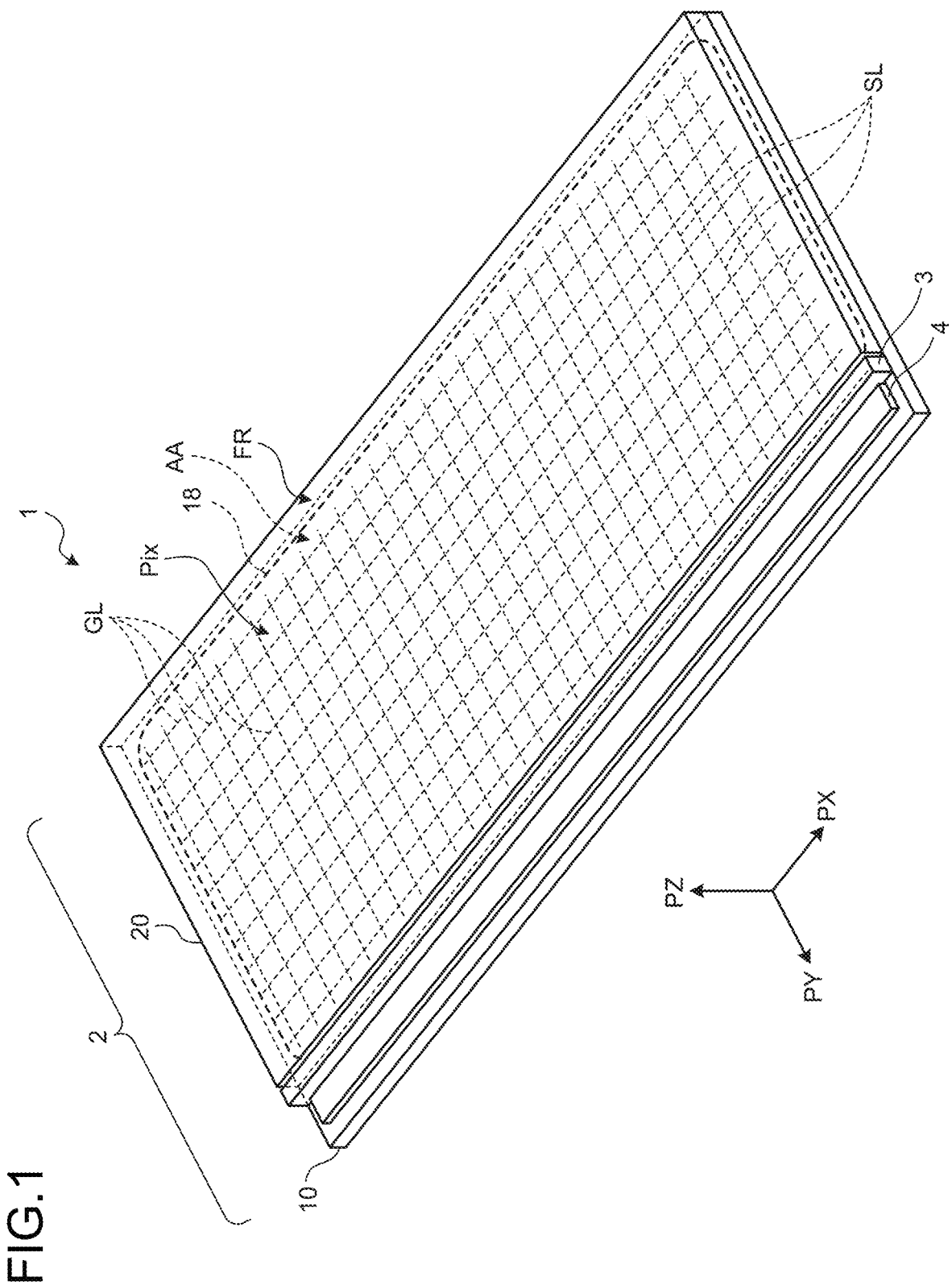
FIG. 1 is a perspective view illustrating an example of a display device according to an embodiment of the present disclosure.

The following describes modes (embodiments) for carrying out the present disclosure in detail with reference to the drawings. The present disclosure is not limited to the description of the embodiments to be given below. Components to be described below include those easily conceivable by those skilled in the art or those substantially identical thereto. In addition, the components to be described below can be combined as appropriate. What is disclosed herein is merely an example, and the present disclosure naturally encompasses appropriate modifications easily conceivable by those skilled in the art while maintaining the gist of the disclosure. To further clarify the description, the drawings schematically illustrate, for example, widths, thicknesses, and shapes of various parts as compared with actual aspects thereof, in some cases. However, they are merely examples, and interpretation of the present disclosure is not limited thereto. The same element as that illustrated in a drawing that has already been discussed is denoted by the same reference numeral through the description and the drawings, and detailed description thereof will not be repeated in some cases where appropriate.

In this disclosure, when an element is described as being "on" another element, the element can be directly on the other element, or there can be one or more elements between the element and the other element.

First Embodiment

Figure 2:
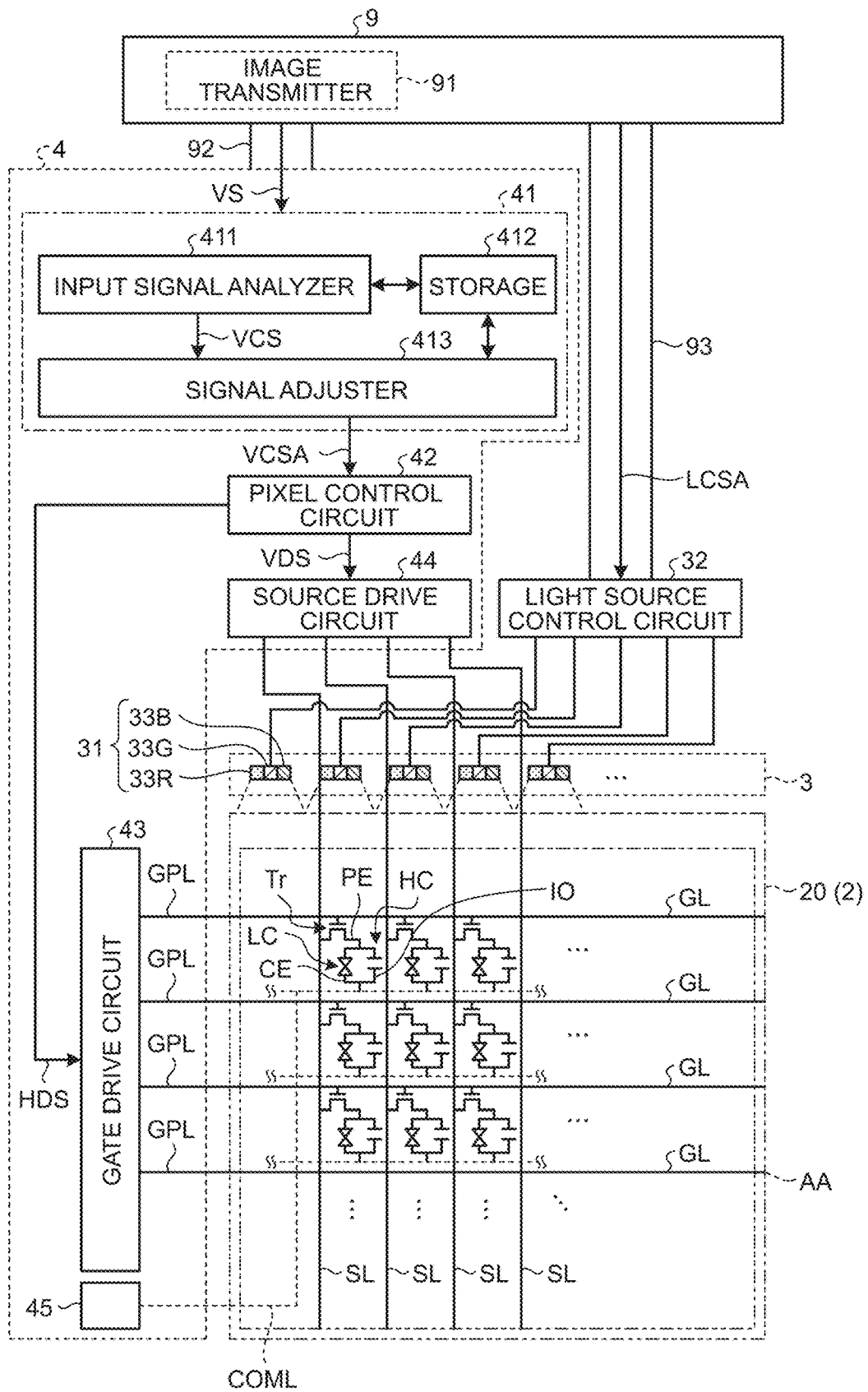
FIG. 2 is a block diagram illustrating the display device according to a first embodiment of the present disclosure.
Figure 3:
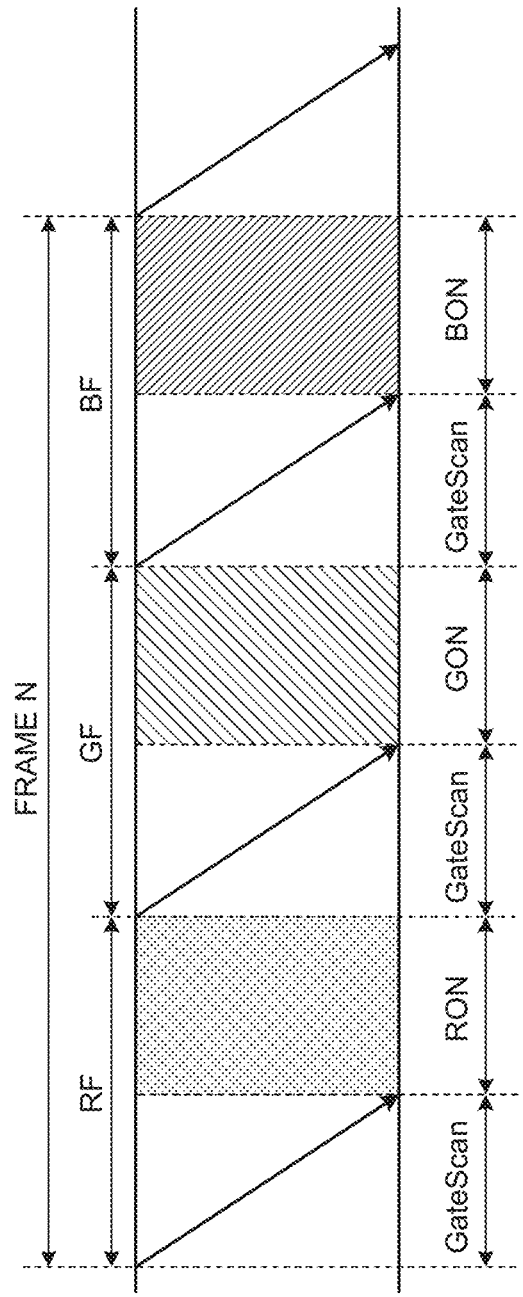
FIG. 3 is a timing diagram explaining timing of light emission by a light source in a field-sequential system of the first embodiment.

FIG. 1 is a perspective view illustrating an example of a display device according to an embodiment of the present disclosure. FIG. 2 is a block diagram illustrating a display device according to a first embodiment of the present disclosure. FIG. 3 is a timing diagram explaining timing of light emission by a light source in a field-sequential system.

As illustrated in FIG. 1, a display device 1 includes a display panel 2, a light source 3, and a drive circuit 4. A direction PX denotes one direction in the plane of the display panel 2. A second direction PY denotes a direction orthogonal to the direction PX. A third direction PZ denotes a direction orthogonal to the PX-PY plane.

Figure 5:
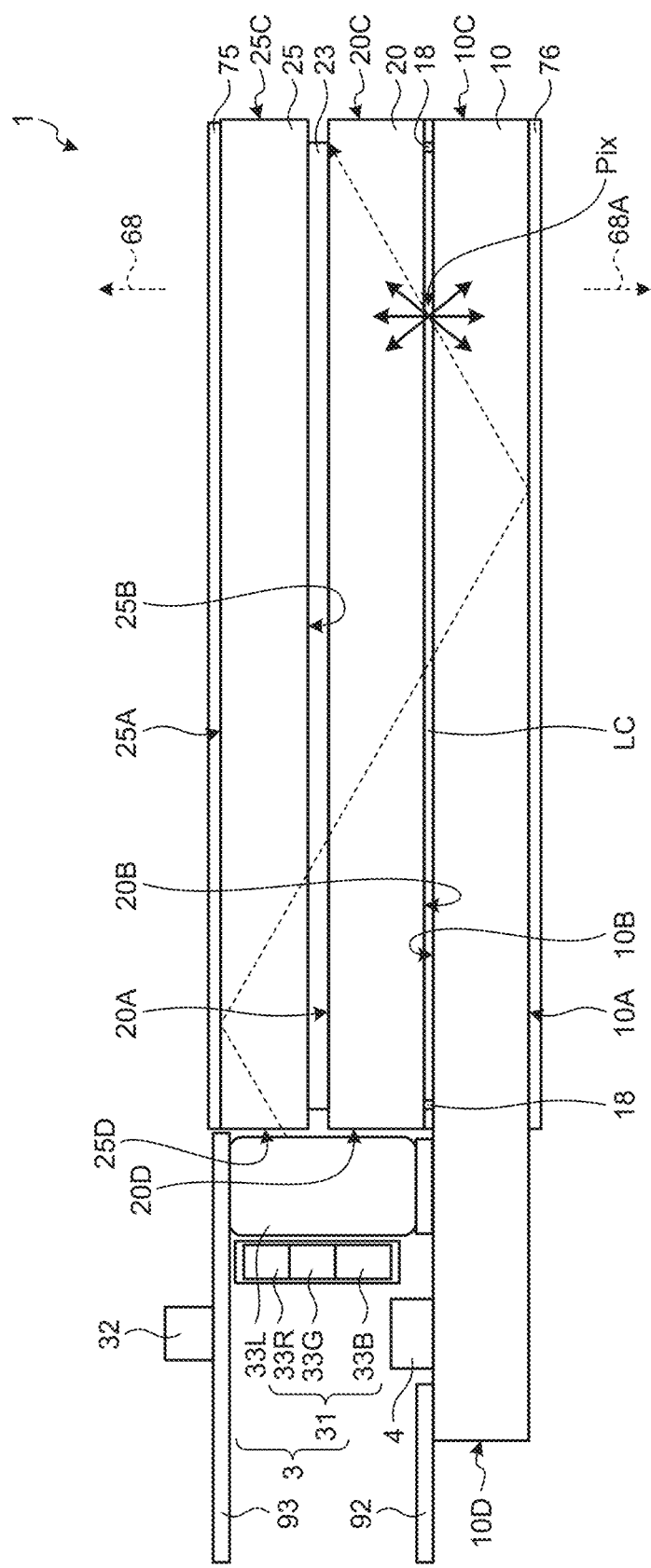
FIG. 5 is a sectional view illustrating an example of a section of the display device.

The display panel 2 includes an array substrate 10, a counter substrate 20, and a liquid crystal layer 50 (refer to FIG. 5). The array substrate 10 serves as a first light-transmitting substrate, and the counter substrate 20 serves as a second light-transmitting substrate. The counter substrate 20 faces a surface of the array substrate 10 in a direction orthogonal thereto (in the direction PZ illustrated in FIG. 1). In the liquid crystal layer 50 (refer to FIG. 5), polymer-dispersed liquid crystals LC (to be described later) are sealed by the array substrate 10, the counter substrate 20, and a sealing portion 18.

As illustrated in FIG. 1, the display panel 2 has an active region AA capable of displaying images and a peripheral region FR outside the active region AA. A plurality of pixels Pix are arranged in a matrix having a row-column configuration in the active region AA. In the present disclosure, a row refers to a pixel row including m pixels Pix arranged in one direction. In addition, a column refers to a pixel column including n pixels Pix arranged in a direction orthogonal to the direction in which the rows are arranged. The values of m and n are determined depending on a display resolution in the vertical direction and a display resolution in the horizontal direction. A plurality of scan lines GL are provided corresponding to the rows, and a plurality of signal lines SL are provided corresponding to the columns.

As illustrated in FIG. 2, the light source 3 includes a plurality of light emitters 31. A light source controller (light source control circuit) 32 is provided on a wiring substrate 93. The wiring substrate 93 is a flexible printed circuit board or a printed circuit board (PCB) substrate. A light source control signal LCSA is transmitted from an image transmitter 91 of an external higher-level controller 9 to the light source controller 32. The light source control signal LCSA is a signal including information on light quantities of the light emitters 31 set according to, for example, input gradation values given to the pixels Pix.

As illustrated in FIG. 1, the drive circuit 4 is fixed to the surface of the array substrate 10. As illustrated in FIG. 2, the drive circuit 4 includes a signal processing circuit 41, a pixel control circuit 42, a gate drive circuit 43, a source drive circuit 44, and a common potential drive circuit 45. The array substrate 10 has an area in the PX-PY plane larger than that of the counter substrate 20, and the drive circuit 4 is provided on a projecting portion of the array substrate 10 exposed from the counter substrate 20.

The signal processing circuit 41 receives a first input signal (such as a red-green-blue (RGB) signal) VS from the image transmitter 91 of the external higher-level controller 9 through a flexible printed circuit board 92.

The signal processing circuit 41 includes an input signal analyzer 411, a storage 412, and a signal adjuster 413. The input signal analyzer 411 generates a second input signal VCS based on the externally received first input signal VS.

The second input signal VCS is a signal for determining a gradation value to be given to each of the pixels Pix of the display panel 2 based on the first input signal VS. In other words, the second input signal VCS is a signal including gradation information on the gradation value of each of the pixels Pix.

The signal adjuster 413 generates a third input signal VCSA from the second input signal VCS. The signal adjuster 413 transmits the third input signal VCSA to the pixel control circuit 42.

The pixel control circuit 42 generates a horizontal drive signal HDS and a vertical drive signal VDS based on the third input signal VCSA. In the present embodiment, since the display device 1 is driven based on the field-sequential system, the horizontal drive signal HDS and the vertical drive signal VDS are generated for each color emittable by the light emitters 31.

The gate drive circuit 43 sequentially selects the scan lines GL of the display panel 2 based on the horizontal drive signal HDS within one vertical scan period. The scan lines GL can be selected in any order. The gate drive circuit 43 is electrically coupled to the scan lines GL through second wiring GPL arranged in the peripheral region FR outside the active region AA (refer to FIG. 1).

The source drive circuit 44 supplies gradation signals corresponding to output gradation values of the pixels Pix to the signal lines SL of the display panel 2 based on the vertical drive signal VDS within one horizontal scan period.

In the present embodiment, the display panel 2 is an active matrix panel. Therefore, the display panel 2 includes the signal (source) lines SL extending in the second direction PY and the scan (gate) lines GL extending in the first direction PX in plan view, and includes switching elements Tr at intersections between the signal lines SL and the scan lines GL.

A thin-film transistor is used as each of the switching elements Tr. A bottom-gate transistor or a top-gate transistor may be used as an example of the thin-film transistor. Although a single-gate thin film transistor is exemplified as the switching element Tr, the switching element Tr may be a double-gate transistor. One of the source electrode and the drain electrode of the switching element Tr is coupled to a corresponding one of the signal lines SL. The gate electrode of the switching element Tr is coupled to a corresponding one of the scan lines GL. The other of the source electrode and the drain electrode is coupled to one end of a capacitor of the polymer-dispersed liquid crystals LC to be described later. The capacitor of the polymer-dispersed liquid crystals LC is coupled at one end thereof to the switching element Tr through a pixel electrode PE, and coupled at the other end thereof to common potential wiring COML through a common electrode CE. Holding capacitance HC is generated between the pixel electrode PE and a holding capacitance electrode IO electrically coupled to the common potential wiring COML. The common potential wiring COML is supplied with a potential from the common potential drive circuit 45.

Each of the light emitters 31 includes a light emitter 33R of a first color (such as red), a light emitter 33G of a second color (such as green), and a light emitter 33B of a third color (such as blue). The light source controller 32 controls the light emitter 33R of the first color, the light emitter 33G of the second color, and the light emitter 33B of the third color so as to emit light in a time-division manner based on the light source control signal LCSA. In this manner, the light emitter 33R of the first color, the light emitter 33G of the second color, and the light emitter 33B of the third color are driven based on the field-sequential system.

As illustrated in FIG. 3, in a first sub-frame (first predetermined time) RF, the light emitter 33R of the first color emits light during a first color light emission period RON, and the pixels Pix selected during one vertical scan period GateScan scatter light to perform display. On the entire display panel 2, if the gradation signal corresponding to the output gradation value of each of the pixels Pix is supplied to the above-described signal lines SL for the pixels Pix selected during the one vertical scan period GateScan, only the first color is lit up during the first color light emission period RON.

Then, in a second sub-frame (second predetermined time) GF, the light emitter 33G of the second color emits light during a second color light emission period GON, and the pixels Pix selected during the one vertical scan period GateScan scatter light to perform display. On the entire display panel 2, if the gradation signal corresponding to the output gradation value of each of the pixels Pix is supplied to the above-described signal lines SL for the pixels Pix selected during the one vertical scan period GateScan, only the second color is lit up during the second color light emission period GON.

Further, in a third sub-frame (third predetermined time) BF, the light emitter 33B of the third color emits light during a third color light emission period BON, and the pixels Pix selected during the one vertical scan period GateScan scatter light to perform display. On the entire display panel 2, if the gradation signal corresponding to the output gradation value of each of the pixels Pix is supplied to the above-described signal lines SL for the pixels Pix selected during the one vertical scan period GateScan, only the third color is lit up during the third color light emission period BON.

Since a human eye has limited temporal resolving power and produces an afterimage, an image with a combination of three colors is recognized in a period of one frame (1F). The field-sequential system can eliminate the need for a color filter, and thus can reduce an absorption loss by the color filter. As a result, higher transmittance can be obtained. In the color filter system, one pixel is made up of sub-pixels obtained by dividing each of the pixels Pix into the sub-pixels of the first color, the second color, and the third color. In contrast, in the field-sequential system, the pixel need not be divided into the sub-pixels in such a manner. A fourth sub-frame may be further included to emit light in a fourth color different from any one of the first color, the second color, and the third color.

Figure 4:
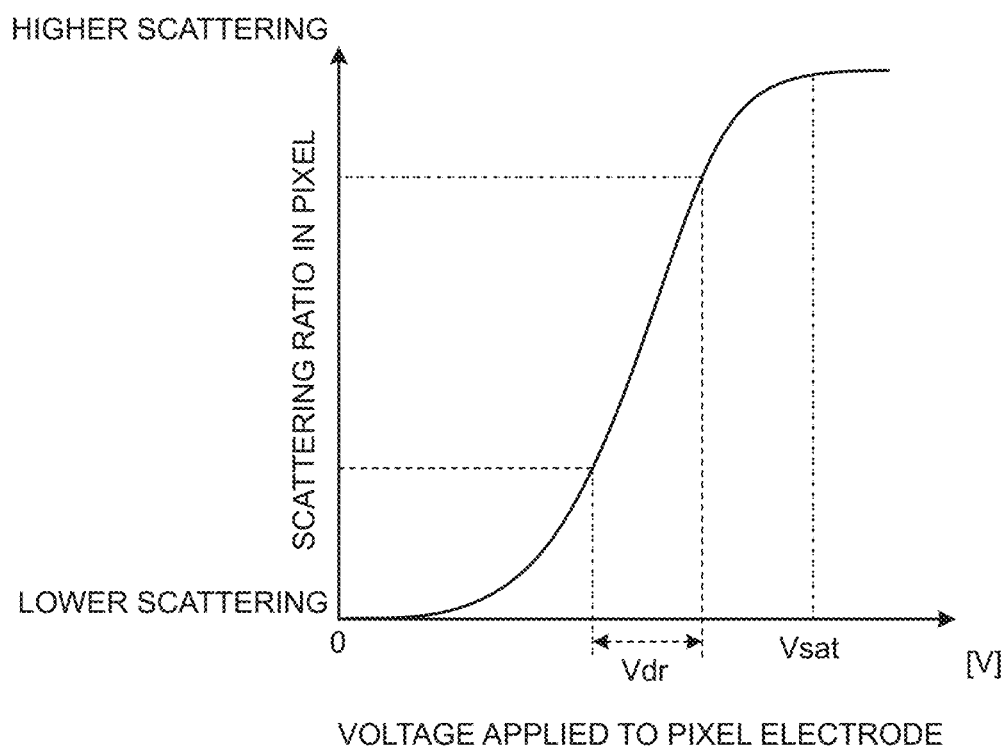
FIG. 4 is an explanatory diagram illustrating a relation between a voltage applied to a pixel electrode and a scattering state of a pixel.
Figure 6:
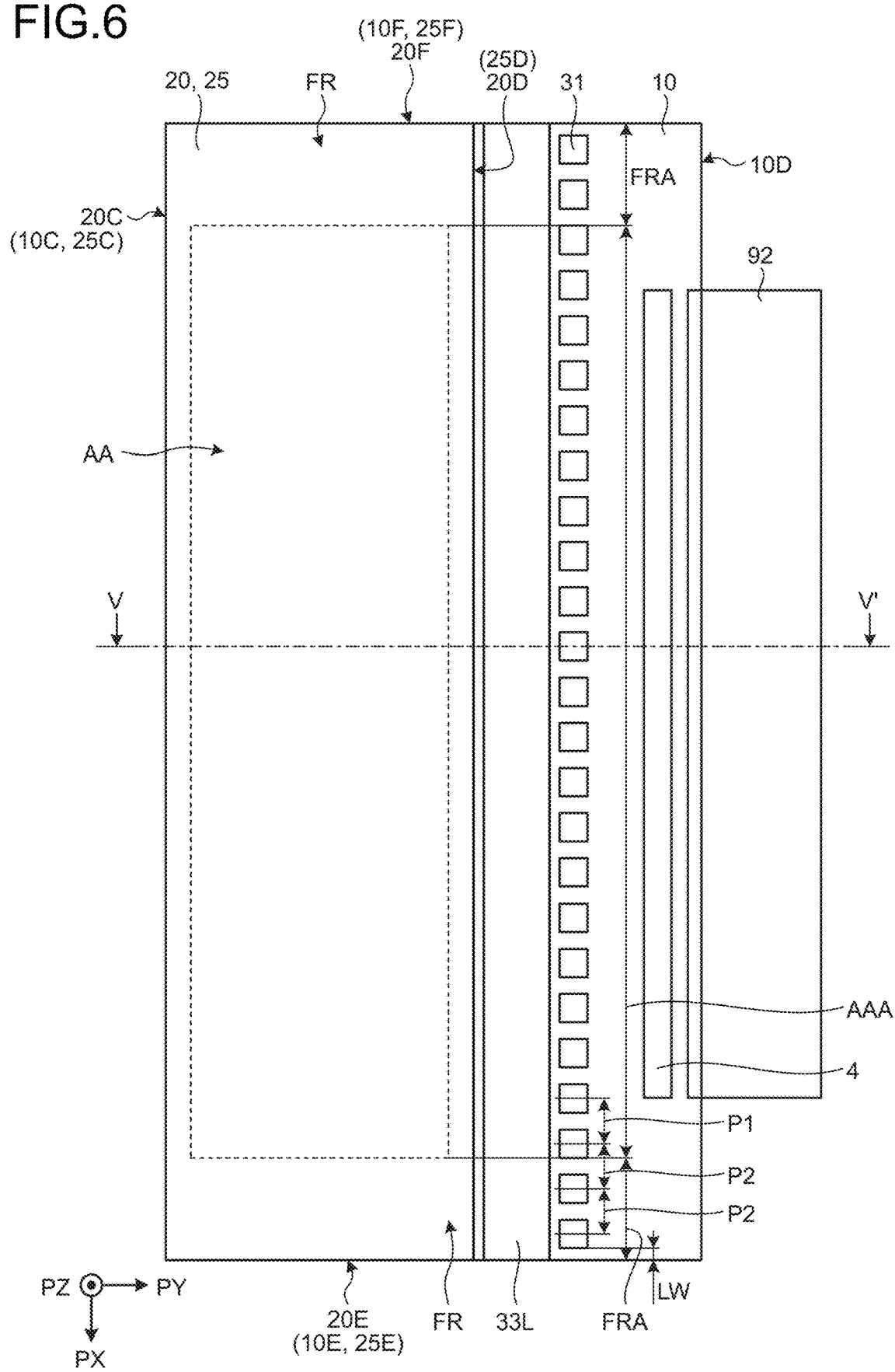
FIG. 6 is a plan view illustrating a planar surface of the display device of FIG. 1.
Figure 7:
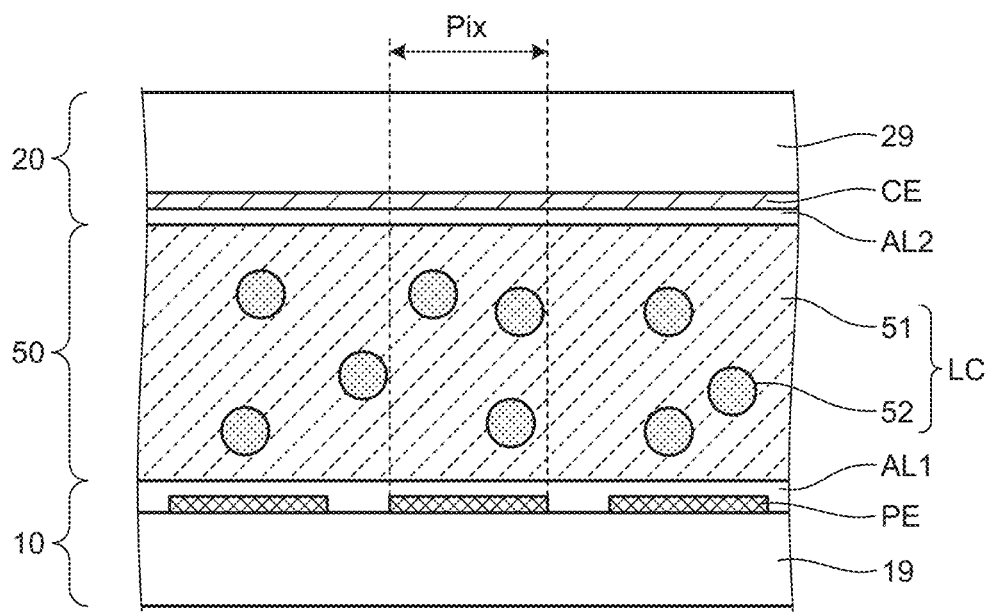
FIG. 7 is an enlarged sectional view obtained by enlarging a liquid crystal layer portion of FIG. 5.
Figure 8:
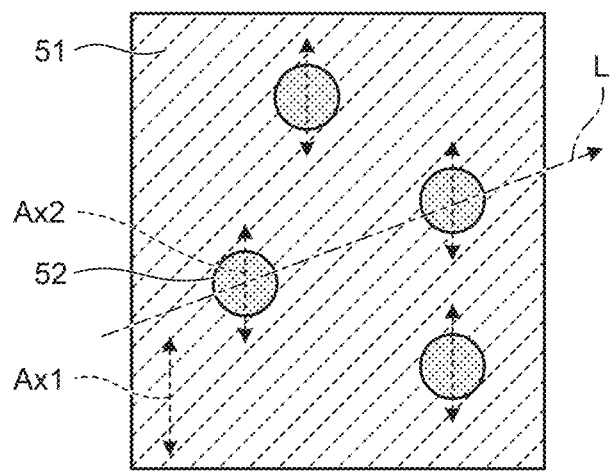
FIG. 8 is a sectional view for explaining a non-scattering state in the liquid crystal layer.
Figure 9:
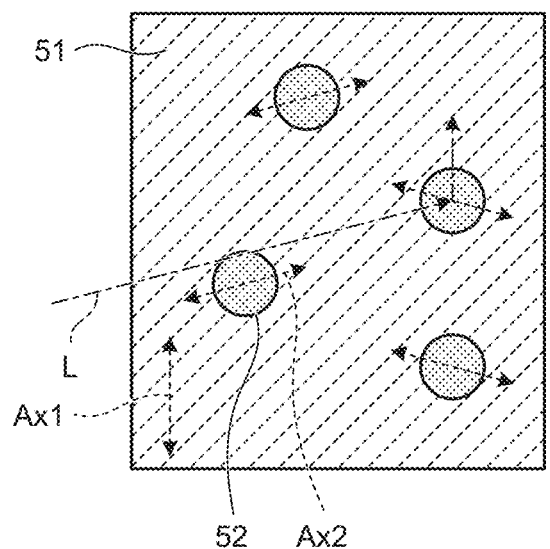
FIG. 9 is a sectional view for explaining the scattering state in the liquid crystal layer.

FIG. 4 is an explanatory diagram illustrating a relation between a voltage applied to the pixel electrode and a scattering state of the pixel. FIG. 5 is a sectional view illustrating an example of a section of the display device of FIG. 1. FIG. 6 is a plan view illustrating a planar surface of the display device of FIG. 1. FIG. 7 is an enlarged sectional view obtained by enlarging the liquid crystal layer portion of FIG. 5. FIG. 8 is a sectional view for explaining a non-scattering state in the liquid crystal layer. FIG. 9 is a sectional view for explaining the scattering state in the liquid crystal layer.

If the gradation signal corresponding to the output gradation value of each of the pixels Pix is supplied to the above-described signal lines SL for the pixels Pix selected during the one vertical scan period GateScan, a voltage applied to the pixel electrode PE changes with the gradation signal. The change in the voltage applied to the pixel electrode PE changes the voltage between the pixel electrode PE and the common electrode CE. The scattering state of the liquid crystal layer 50 for each of the pixels Pix is controlled according to the voltage applied to the pixel electrode PE, and the scattering ratio in the pixels Pix changes, as illustrated in FIG. 4.

As illustrated in FIG. 4, the change in the scattering ratio in the pixel Pix is smaller when the voltage applied to the pixel electrode PE is equal to or higher than a saturation voltage Vsat. Therefore, the drive circuit 4 changes the voltage applied to the pixel electrode PE according to the vertical drive signal VDS within a voltage range Vdr lower than the saturation voltage Vsat.

As illustrated in FIG. 5, the display device 1 includes a light-transmitting base member 25 and the display panel 2. A protective layer 75 is provided on one surface of the light-transmitting base member 25. A protective layer 76 is provided on one surface of the display panel 2.

The display panel 2 includes the array substrate 10, the counter substrate 20, and the liquid crystal layer 50. The counter substrate 20 faces the surface of the array substrate 10 in the direction orthogonal thereto (in the direction PZ illustrated in FIG. 1). In the liquid crystal layer 50, the polymer-dispersed liquid crystals (to be described later) are sealed by the array substrate 10, the counter substrate 20, and the sealing portion 18.

As illustrated in FIGS. 5 and 6, the array substrate 10 has a first principal surface 10A, a second principal surface 10B, a first side surface 10C, a second side surface 10D, a third side surface 10E, and a fourth side surface 10F. The first principal surface 10A and the second principal surface 10B are parallel flat surfaces. The first side surface 10C and the second side surface 10D are parallel flat surfaces. The third side surface 10E and the fourth side surface 10F are parallel flat surfaces.

As illustrated in FIGS. 5 and 6, the counter substrate 20 has a first principal surface 20A, a second principal surface 20B, a first side surface 20C, a second side surface 20D, a third side surface 20E, and a fourth side surface 20F. The first principal surface 20A and the second principal surface 20B are parallel flat surfaces. The first side surface 20C and the second side surface 20D are parallel flat surfaces. The third side surface 20E and the fourth side surface 20F are parallel flat surfaces.

The base member 25 is bonded to the first principal surface 20A of the counter substrate 20 with an optical resin 23 interposed therebetween. The base member 25 is a protective substrate for the counter substrate 20 and is formed, for example, of glass or a light-transmitting resin. When the base member 25 is a glass base member, it is also called a cover glass. When the base member 25 is formed of a light-transmitting resin, it may be flexible. The same base member as the base member 25 may be bonded to the first principal surface 10A of the array substrate 10 with an optical resin interposed therebetween.

As illustrated in FIGS. 5 and 6, the base member 25 has a first principal surface 25A, a second principal surface 25B, a first side surface 25C, a second side surface 25D, a third side surface 25E, and a fourth side surface 25F. The first principal surface 25A and the second principal surface 25B are parallel flat surfaces. The first side surface 25C and the second side surface 25D are parallel flat surfaces. The third side surface 25E and the fourth side surface 25F are parallel flat surfaces.

As illustrated in FIGS. 5 and 6, the light source 3 faces the second side surface 20D of the counter substrate 20. The light source 3 may also be called a side light source. As illustrated in FIG. 5, the light source 3 emits light-source light L to the second side surface 20D of the counter substrate 20. The second side surface 20D of the counter substrate 20 facing the light source 3 serves as a plane of light incidence. The second side surface 25D of the base member 25 facing the light source 3 also serves as a plane of light incidence.

The light source 3 includes the light emitters 31 and a light guide 33L. The light emitter 31 includes the light emitter 33R of the first color (such as red), the light emitter 33G of the second color (such as green), and the light emitter 33B of the third color (such as blue). The light guide 33L guides the light emitted by the light emitter 33R of the first color, the light emitter 33G of the second color, and the light emitter 33B of the third color to the second side surface 20D of the counter substrate 20 and the second side surface 25D of the base member 25. The light guide 33L simultaneously receives the light from the light emitters 31, internally diffuses the received light, and emits the diffused light to the display panel 2. As a result, the second side surface 20D of the counter substrate 20 and the second side surface 25D of the base member 25 are illuminated with light that is distributed uniformly per unit area.

The light guide 33L is a single light guide 33L formed integrally from the third side surface 20E (or the third side surface 25E) to the fourth side surface 20F (or the fourth side surface 25F). The light guide 33L may be formed by arranging a plurality of divided light guides from the third side surface 20E (or the third side surface 25E) to the fourth side surface 20F (or the fourth side surface 25F). The light guide 33L may be formed by arranging a plurality of divided light guides from the third side surface 20E (or the third side surface 25E) to the fourth side surface 20F (or the fourth side surface 25F) and connecting the adjacent light guides to each other.

The light source 3 is mounted so as to overlap the second principal surface 10B of the array substrate 10. The following description will be made based on this embodiment, but the present disclosure is not limited to this example. The light source 3 may irradiate a side surface of the array substrate 10.

The wiring substrate 93 (flexible printed circuit board or PCB substrate) is equipped with an integrated circuit of the light source controller 32, and the light source controller 32 is coupled to the light source 3 through the wiring substrate 93 (flexible printed circuit board or PCB substrate).

As illustrated in FIG. 5, the light-source light L emitted from the light source 3 propagates in a direction (second direction PY) away from the second side surface 20D while being reflected by the base member 25, the first principal surface 10A of the array substrate 10, and the first principal surface 20A of the counter substrate 20 or the base member 25. When the light-source light L travels outward from the first principal surface 10A of the array substrate 10 or the first principal surface 20A of the counter substrate 20, the light-source light L enters a medium having a lower refractive index from a medium having a higher refractive index. Hence, if the angle of incidence of the light-source light L incident on the first principal surface 10A of the array substrate 10 or the first principal surface 20A of the counter substrate 20 is larger than a critical angle, the light-source light L is totally reflected by the first principal surface 10A of the array substrate 10 or the first principal surface 20A of the counter substrate 20.

As illustrated in FIG. 5, the light-source light L that has propagated in the array substrate 10 and the counter substrate 20 is scattered by the pixels Pix including the liquid crystals placed in the scattering state, and the angle of incidence of the scattered light becomes an angle smaller than the critical angle. Thus, emission light 68 or 68A is emitted outward from the first principal surface 20A of the counter substrate 20 (the first principal surface 25A of the base member 25) or the first principal surface 10A of the array substrate 10, respectively. The emission light 68 or 68A emitted outward from the first principal surface 20A of the counter substrate 20 or the first principal surface 10A of the array substrate 10, respectively, is viewed by a viewer.

Therefore, as illustrated in FIG. 6, the light emitters 31 are arranged at intervals of a first pitch P1 in a second region AAA corresponding to the active region AA in the second direction PY. In the first embodiment, the light emitters 31 are arranged at intervals of a second pitch P2 in a first region FRA corresponding to the peripheral region FR in the second direction PY. The first pitch P1 of the light emitters 31 and the second pitch P2 of the light emitters 31 are each a center-to-center distance in the first direction PX between the adjacent light emitters 31. In the first embodiment, the first pitch P1 of the light emitters 31 is smaller than the second pitch P2 of the light emitters 31.

A distance LW from the light emitter 31 to the third side surface 20E (or fourth side surface 20F) in the first direction PX is within a range from 0 mm to half the distance of the first region FRA. The shorter the distance LW between the light emitter 31 provided closest to the third side surface 20E (or fourth side surface 20F) and the third side surface 20E (or fourth side surface 20F), the better.

The following describes the polymer-dispersed liquid crystals in the scattering state and the polymer-dispersed liquid crystals in the non-scattering state, using FIGS. 7 to 9.

As illustrated in FIG. 7, the array substrate 10 is provided with a first orientation film AL1. The counter substrate 20 is provided with a second orientation film AL2. The first and the second orientation films AL1 and AL2 may be, for example, vertical orientation films, or may be orientation films oriented in the first direction PX in which the light emitters 31 are arranged. When the orientation films are subjected to orientation treatment, for example, the orientation direction of the first orientation film AL1 may be taken toward one side of the first direction PX, and the orientation direction of the second orientation film AL2 may be taken toward the other side of the first direction PX. The orientation treatment is performed by performing rubbing treatment or photo-orientation treatment.

A solution containing the liquid crystals and a monomer is filled between the array substrate 10 and the counter substrate 20. Then, in a state where the monomer and the liquid crystals are oriented by the first and the second orientation films AL1 and AL2, the monomer is polymerized by ultraviolet rays or heat to form a bulk 51. This process forms the liquid crystal layer 50 including the reverse-mode polymer-dispersed liquid crystals LC in which liquid crystals are dispersed in gaps of a polymer network formed in the mesh shape.

Thus, the polymer-dispersed liquid crystals LC include the bulk 51 formed of the polymer and a plurality of fine particles 52 dispersed in the bulk 51. The fine particles 52 are formed of the liquid crystals. Both the bulk 51 and the fine particles 52 are optically anisotropic.

The orientation of the liquid crystals included in the fine particles 52 is controlled by a voltage difference between the pixel electrode PE and the common electrode CE. The orientation of the liquid crystals is changed by the voltage applied to the pixel electrode PE. The degree of scattering of light passing through the pixels Pix changes with the change in the orientation of the liquid crystals.

For example, as illustrated in FIG. 8, when no voltage is applied between the pixel electrode PE and the common electrode CE, the direction of an optical axis Ax1 of the bulk 51 is substantially equal to the direction of an optical axis Ax2 of the fine particles 52. The optical axis Ax2 of the fine particles 52 is parallel to the direction PZ of the liquid crystal layer 50. The optical axis Ax1 of the bulk 51 is parallel to the direction PZ of the liquid crystal layer 50 regardless of whether a voltage is applied.

Ordinary-ray refractive indices of the bulk 51 and the fine particles 52 are equal to each other. When no voltage is applied between the pixel electrode PE and the common electrode CE, the difference of refractive index between the bulk 51 and the fine particles 52 is zero in all directions. The liquid crystal layer 50 is placed in the non-scattering state of not scattering the light-source light L. The light-source light L propagates in a direction away from the light source 3 (light emitters 31) while being reflected by the first principal surface 10A of the array substrate 10 and the first principal surface 20A of the counter substrate 20. When the liquid crystal layer 50 is in the non-scattering state of not scattering the light-source light L, a background on the first principal surface 20A side of the counter substrate 20 is visible from the first principal surface 10A of the array substrate 10, and a background on the first principal surface 10A side of the array substrate 10 is visible from the first principal surface 20A of the counter substrate 20.

As illustrated in FIG. 9, in the gap between the pixel electrode PE and the common electrode CE having a voltage applied thereto, the optical axis Ax2 of the fine particles 52 is inclined by an electric field generated between the pixel electrode PE and the common electrode CE. Since the optical axis Ax1 of the bulk 51 is not changed by the electric field, the direction of the optical axis Ax1 of the bulk 51 differs from the direction of the optical axis Ax2 of the fine particles 52. The light-source light L is scattered in the pixel Pix including the pixel electrode PE having a voltage applied thereto. Part of the light-source light L scattered as described above is emitted outward from the first principal surface 10A of the array substrate 10 or the first principal surface 20A of the counter substrate 20 and thus is viewed by the viewer.

In the pixel Pix including the pixel electrode PE having no voltage applied thereto, the background on the first principal surface 20A side of the counter substrate 20 is visible from the first principal surface 10A of the array substrate 10, and the background on the first principal surface 10A side of the array substrate 10 is visible from the first principal surface 20A of the counter substrate 20. In the display device 1 of the present embodiment, when the first input signal VS is received from the image transmitter 91, the voltage is applied to the pixel electrode PE of the pixel Pix for displaying an image, and the image based on the third input signal VCSA becomes visible together with the background. In this manner, an image is displayed in the display region when the polymer-dispersed liquid crystals are in a scattering state.

The light-source light L is scattered in the pixel Pix including the pixel electrode PE having a voltage applied thereto, and emitted outward to display the image, which is displayed so as to be superimposed on the background. In other words, the display device 1 of the present embodiment displays the image overlapping the background by combining the emission light 68 or 68A with the background.

A potential of each of the pixel electrodes PE (refer to FIG. 7) written during the one vertical scan period GateScan illustrated in FIG. 3 needs to be held during at least one of the first color light emission period RON, the second color light emission period GON, and the third color light emission period BON after each vertical scan period GateScan. If the written potential of each of the pixel electrodes PE (refer to FIG. 7) cannot be held during at least one of the first color light emission period RON, the second color light emission period GON, and the third color light emission period BON after each vertical scan period GateScan, what are called flickers, for example, are likely to occur. In other words, in order to shorten the one vertical scan period GateScan serving as a time for selecting the scan lines and increase the visibility in the driving based on what is called the field-sequential system, the written potential of each of the pixel electrodes PE (refer to FIG. 7) is required to be easily held during each of the first color light emission period RON, the second color light emission period GON, and the third color light emission period BON.

Figure 10:
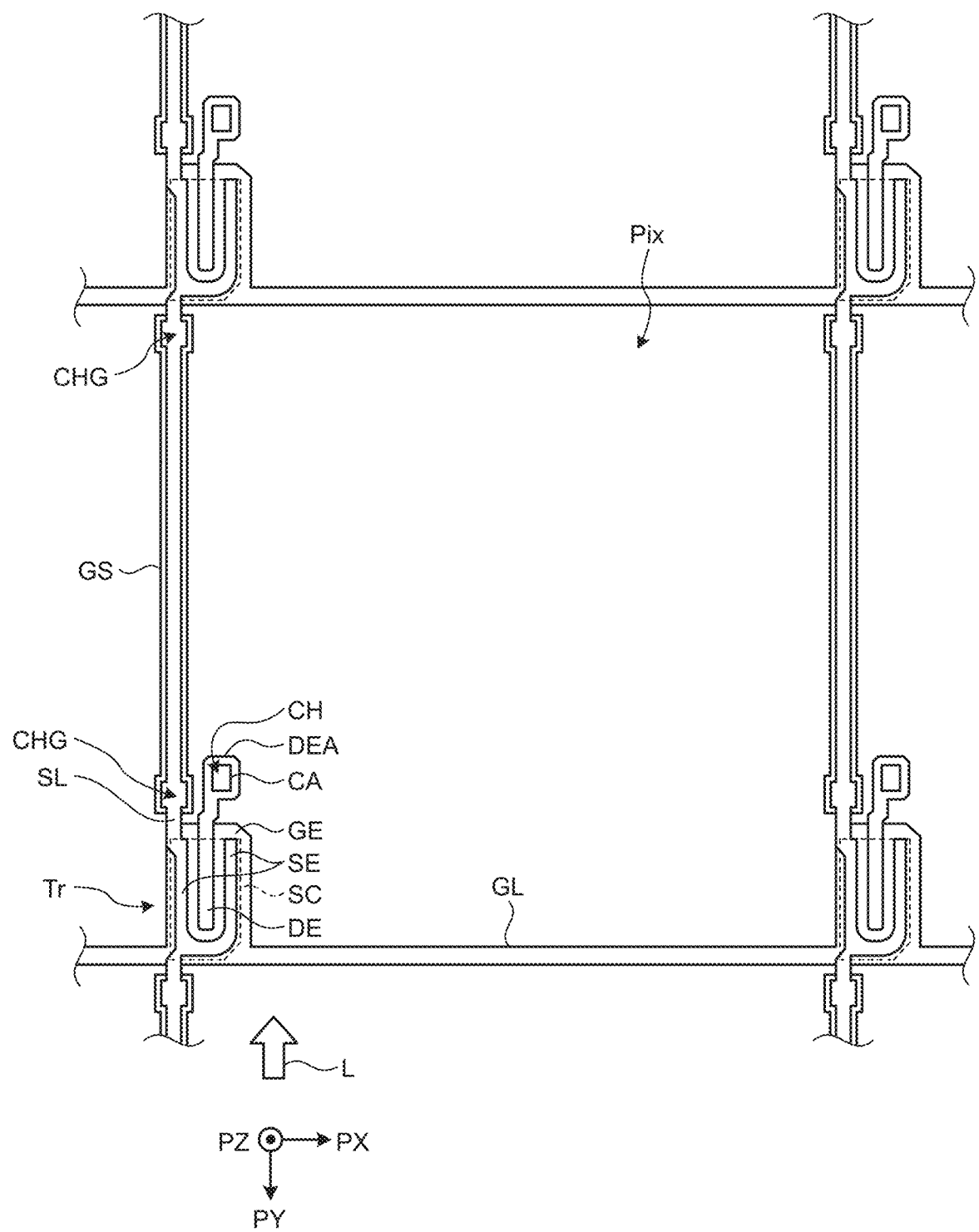
FIG. 10 is a plan view illustrating scan lines, signal lines, and a switching element in the pixel.
Figure 11:
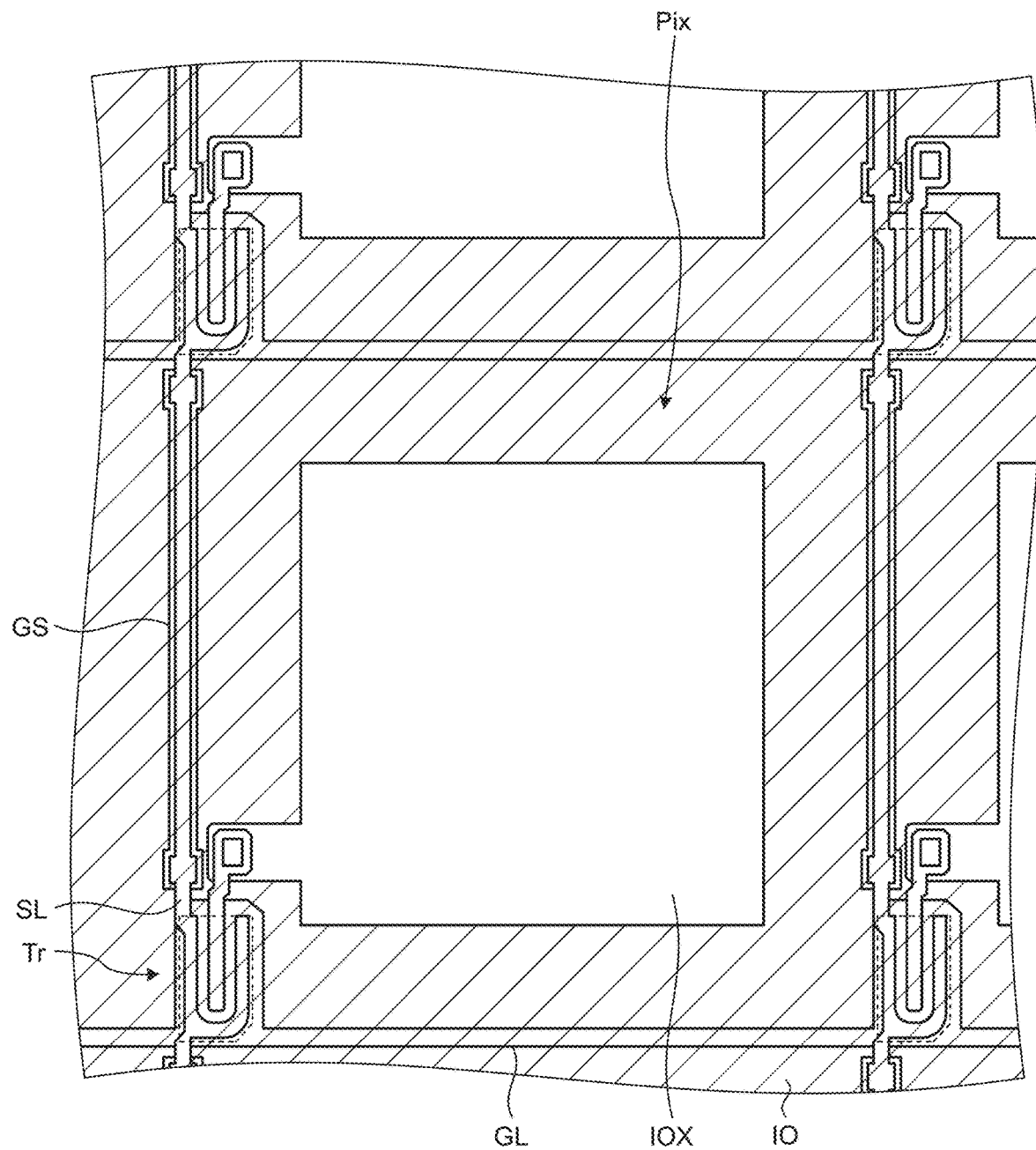
FIG. 11 is a plan view illustrating a holding capacitance layer in the pixel.
Figure 12:
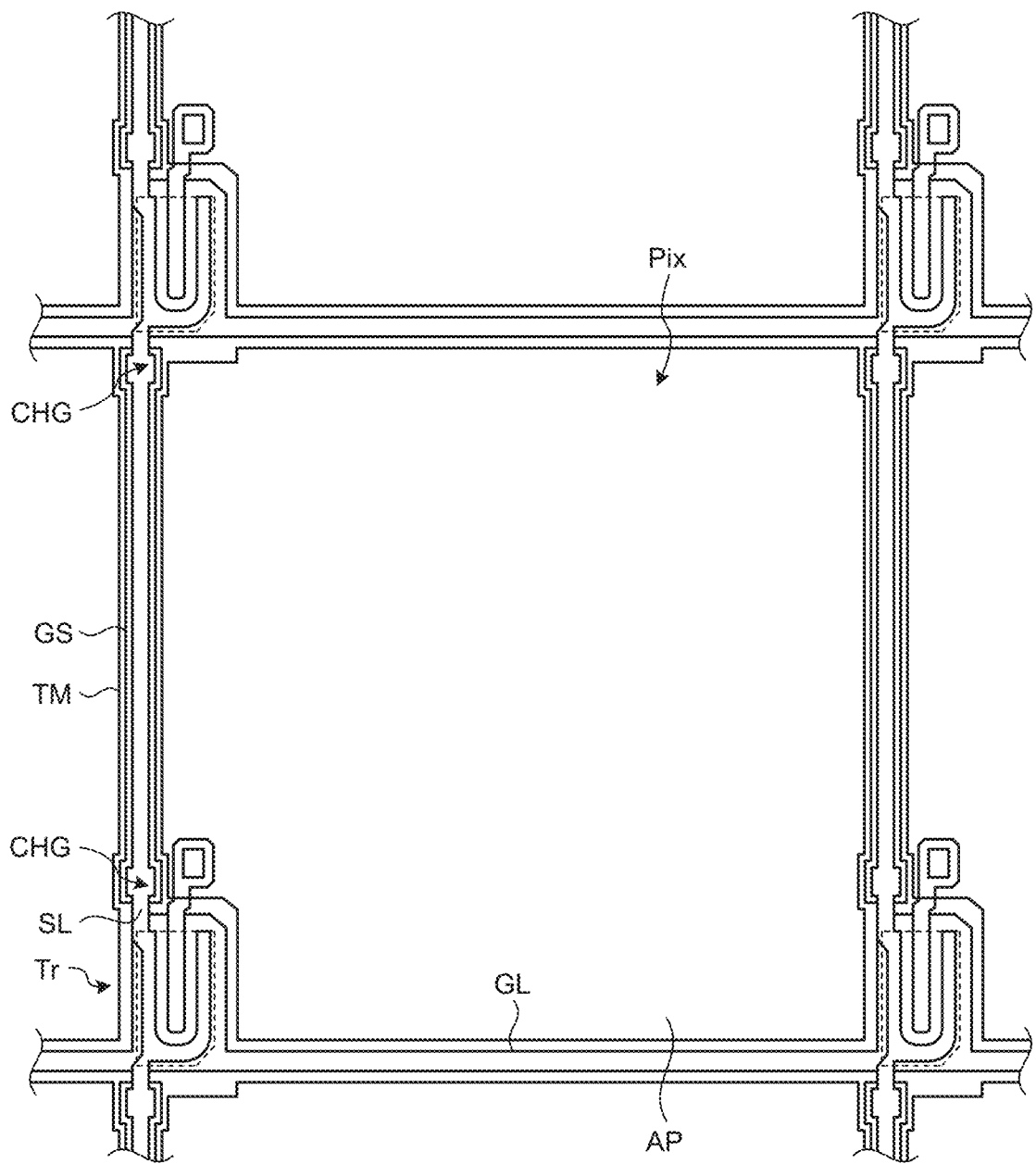
FIG. 12 is a plan view illustrating an auxiliary metal layer and an opening region in the pixel.
Figure 13:
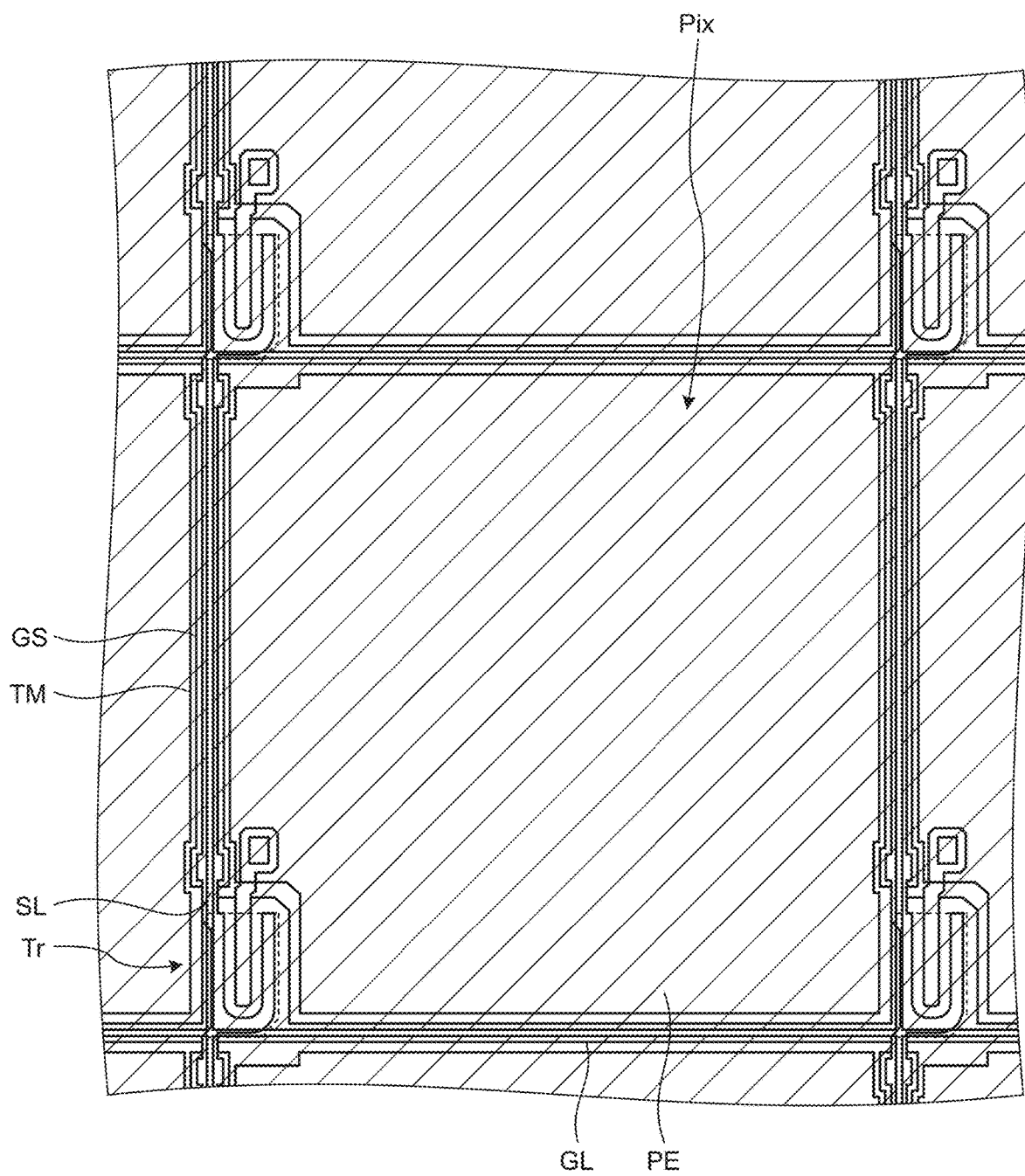
FIG. 13 is a plan view illustrating the pixel electrode in the pixel.
Figure 14:
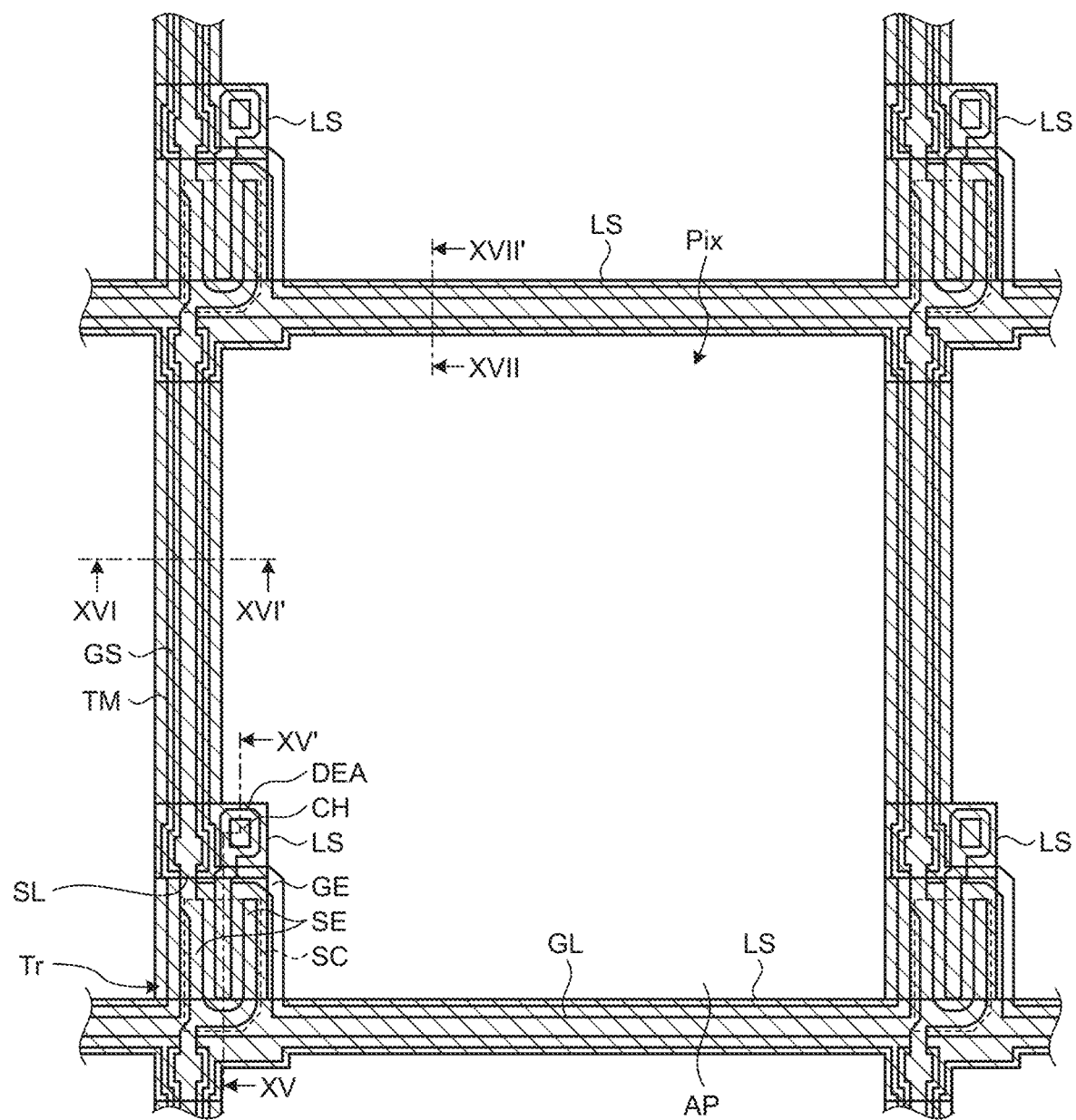
FIG. 14 is a plan view illustrating a light-blocking layer in the pixel.
Figure 15:
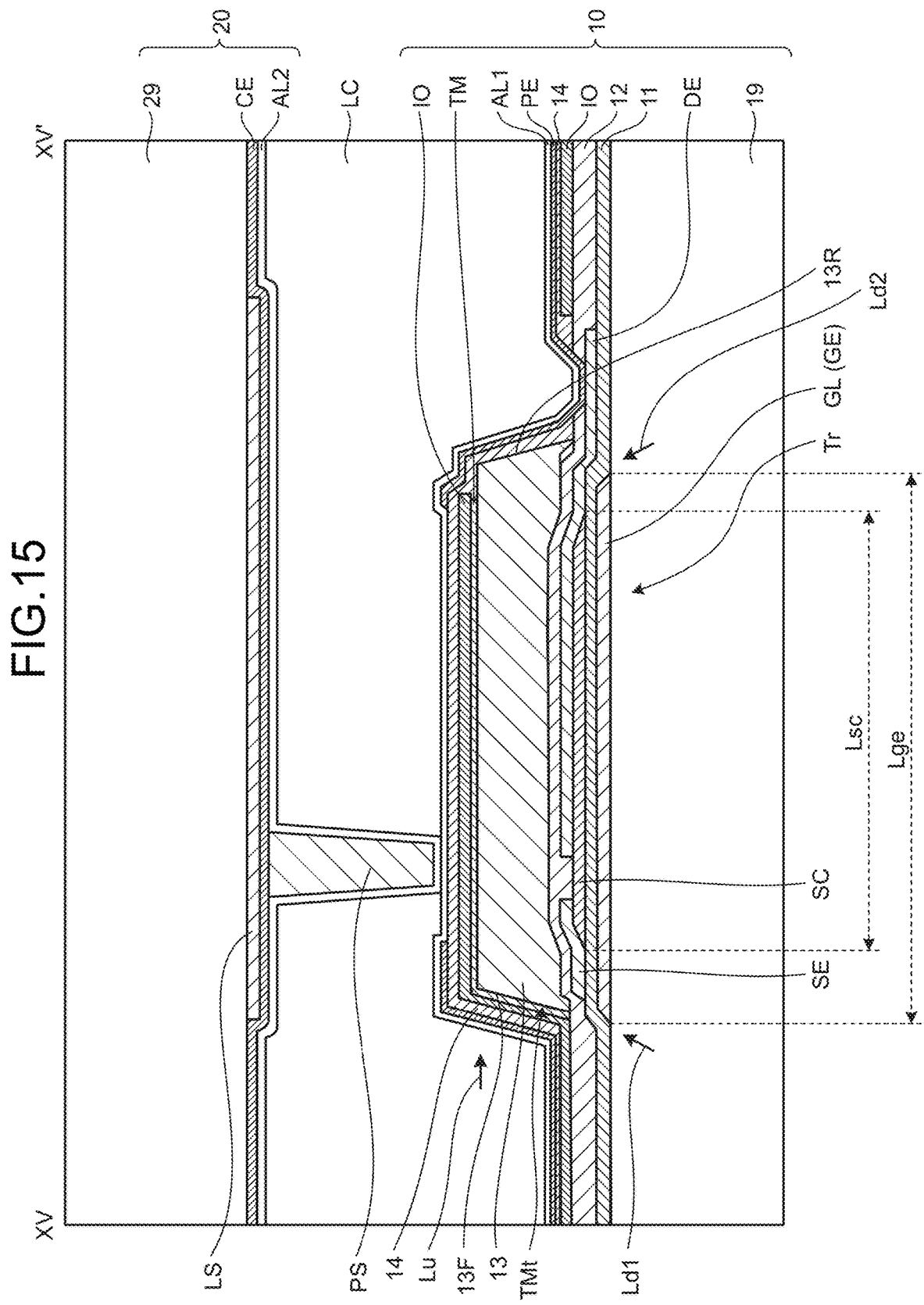
FIG. 15 is a sectional view along XV-XV' of FIG. 14.
Figure 16:
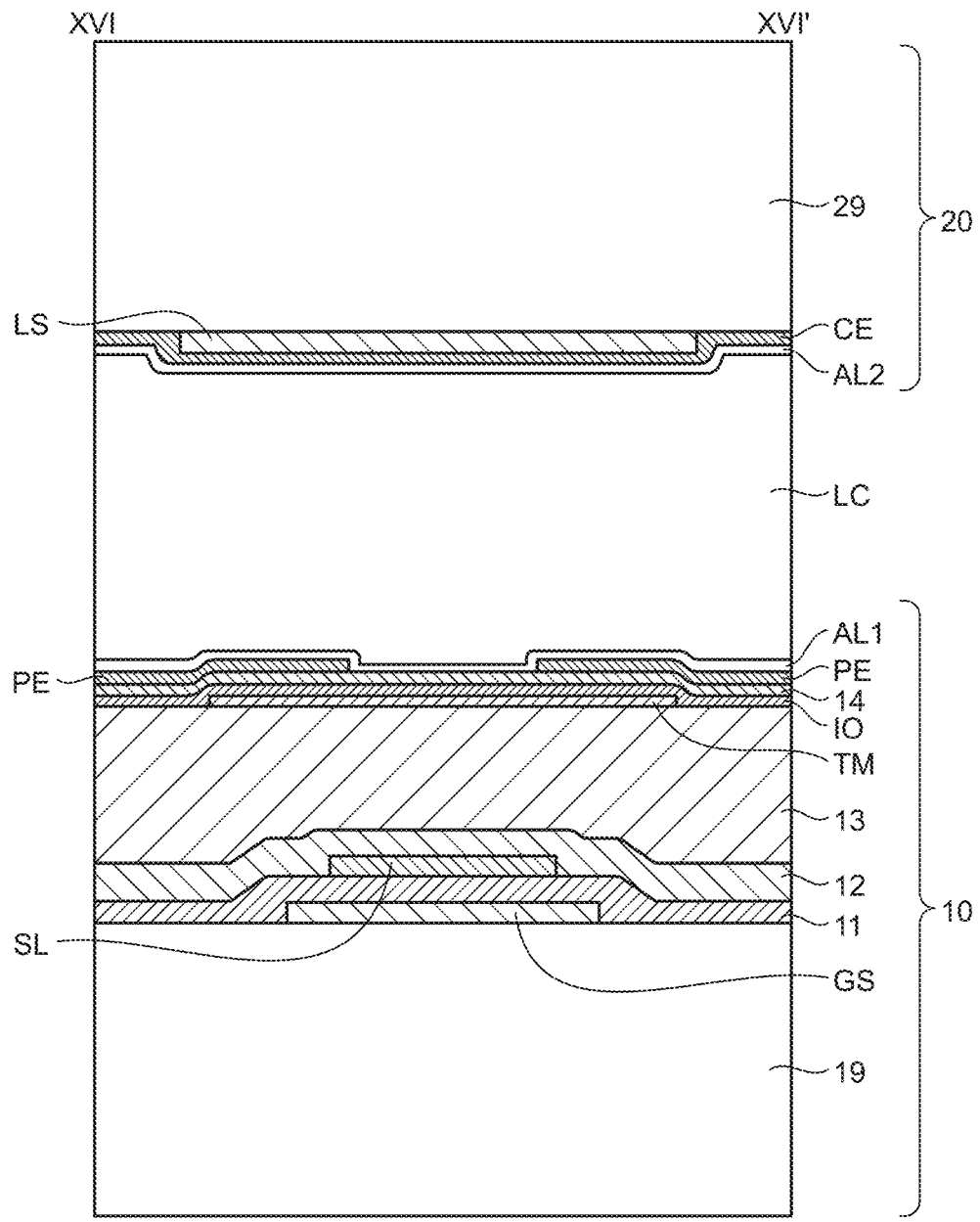
FIG. 16 is a sectional view along XVI-XVI' of FIG. 14.
Figure 17:
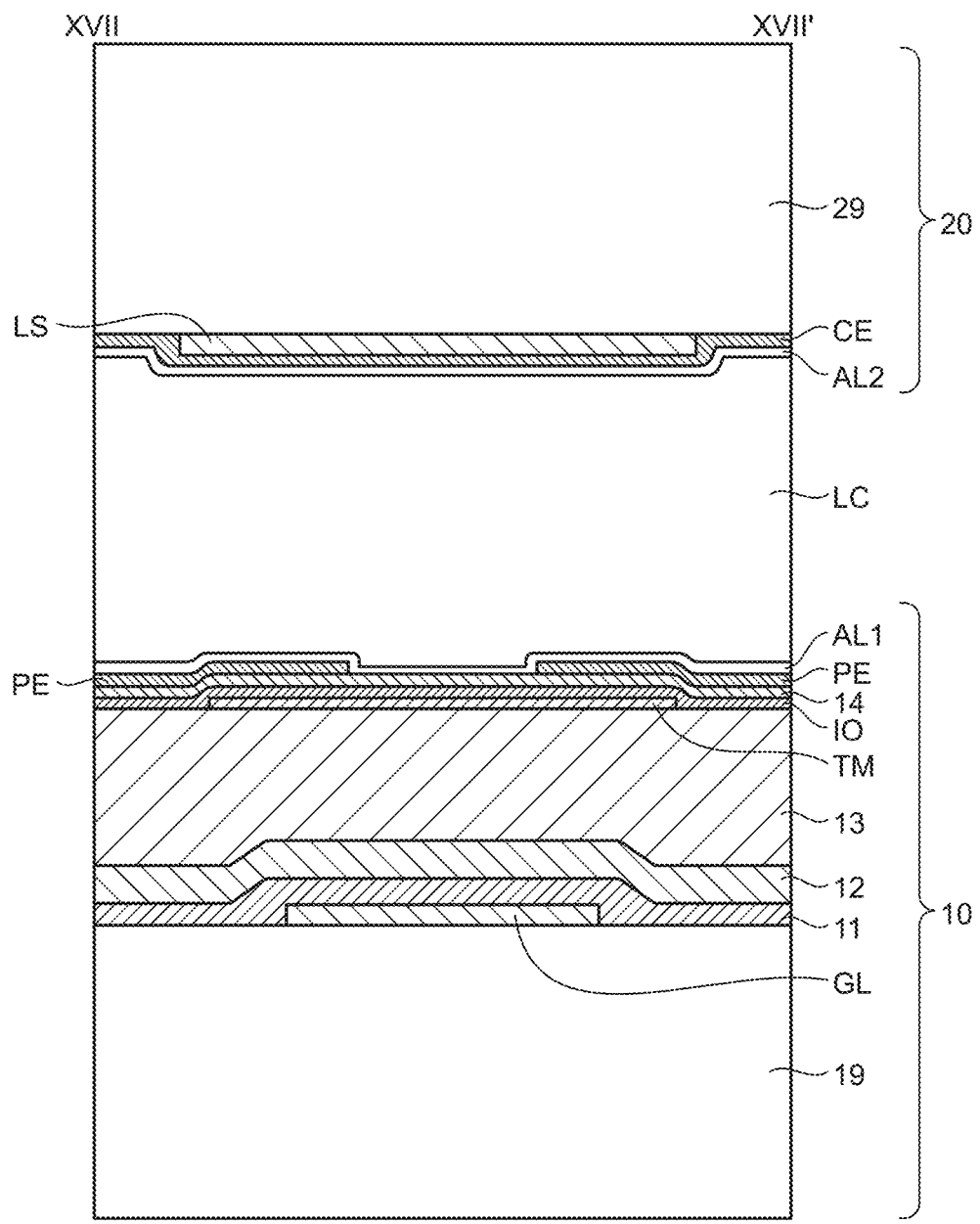
FIG. 17 is a sectional view along XVII-XVII' of FIG. 14.

FIG. 10 is a plan view illustrating the scan lines, the signal lines, and the switching element in the pixel. FIG. 11 is a plan view illustrating a holding capacitance layer in the pixel. FIG. 12 is a plan view illustrating an auxiliary metal layer and an opening region in the pixel. FIG. 13 is a plan view illustrating the pixel electrode in the pixel. FIG. 14 is a plan view illustrating a light-blocking layer in the pixel. FIG. 15 is a sectional view along XV-XV' of FIG. 14. FIG. 16 is a sectional view along XVI-XVI' of FIG. 14. FIG. 17 is a sectional view along XVII-XVII' of FIG. 14. As illustrated in FIGS. 1, 2, and 10, the array substrate 10 is provided with the signal lines SL and the scan lines GL so as to form a grid in plan view. In other words, one surface of the array substrate 10 is provided with the signal lines arranged in the first direction PX with gaps interposed therebetween and the scan lines arranged in the second direction PY with gaps interposed therebetween.

As illustrated in FIG. 10, a region surrounded by the adjacent scan lines GL and the adjacent signal lines SL corresponds to the pixel Pix. The pixel Pix is provided with the pixel electrode PE and the switching element Tr. In the present embodiment, the switching element Tr is a bottom-gate thin film transistor. The switching element Tr includes a semiconductor layer SC overlapping, in plan view, a gate electrode GE electrically coupled to a corresponding one of the scan lines GL.

As illustrated in FIG. 10, the scan lines GL are wiring of a metal such as molybdenum (Mo) or aluminum (Al), a multilayered body of these metals, or an alloy thereof. The signal lines SL are wiring of a metal such as aluminum or an alloy thereof.

As illustrated in FIG. 10, the semiconductor layer SC is provided so as not to protrude from the gate electrode GE in plan view. As a result, the light-source light L traveling toward the semiconductor layer SC from the gate electrode GE side is reflected, and light leakage is less likely to occur in the semiconductor layer SC.

As illustrated in FIG. 5, the light-source light L emitted from the light source 3 is incident in the second direction PY serving as a direction of incidence. The direction of incidence refers to a direction from the second side surface 20D closest to the light source 3 toward the first side surface 20C that is a surface opposite the second side surface 20D. When the direction of incidence of the light-source light L is the second direction PY, the length in the first direction PX of the semiconductor layer SC is smaller than the length in the second direction PY of the semiconductor layer SC. This configuration reduces the length in a direction intersecting the direction of incidence of the light-source light L, and thereby, reduces the effect of light leakage.

As illustrated in FIG. 10, two electrical conductors of a source electrode SE that are the same as the signal line SL extend from the signal line SL in the same layer as that of the signal line SL and in a direction intersecting the signal line. With this configuration, the source electrode SE electrically coupled to the signal line SL overlaps one end of the semiconductor layer SC in plan view.

As illustrated in FIG. 10, in plan view, a drain electrode DE is provided in a position between the adjacent electrical conductors of the source electrode SE. The drain electrode DE overlaps the semiconductor layer SC in plan view. A portion of the semiconductor layer SC overlapping neither the source electrode SE nor the drain electrode DE serves as a channel of the switching element Tr. A contact electrode DEA electrically coupled to the drain electrode DE is electrically coupled to the pixel electrode PE illustrated in FIG. 13 through a contact hole CH.

As illustrated in FIG. 15, the array substrate 10 includes a first light-transmitting base member 19 formed of glass, for example. The material of the first light-transmitting base member 19 may be any material having a light transmitting property and may be, for example, a resin such as polyethylene terephthalate.

As illustrated in FIG. 15, the scan line GL (refer to FIG. 10) and the gate electrode GE are provided on the first light-transmitting base member 19.

In addition, as illustrated in FIG. 15, a first insulating layer 11 is provided so as to cover the scan line GL and the gate electrode GE. The first insulating layer 11 is formed of, for example, a transparent inorganic insulating material such as silicon nitride.

The semiconductor layer SC is stacked on the first insulating layer 11. The semiconductor layer SC is formed of, for example, amorphous silicon, but may be formed of polysilicon or an oxide semiconductor. When viewed in the same section, a length Lsc of the semiconductor layer SC is smaller than a length Lge of the gate electrode GE overlapping the semiconductor layer SC. With this configuration, the gate electrode GE can block light Ld1 that has propagated in the first light-transmitting base member 19. As a result, the light leakage of the switching element Tr of the first embodiment is reduced.

The source electrode SE and the signal line SL covering a portion of the semiconductor layer SC and the drain electrode DE covering a portion of the semiconductor layer SC are provided on the first insulating layer 11. The drain electrode DE is formed of the same material as that of the signal line SL. A second insulating layer 12 is provided on the semiconductor layer SC, the signal line SL, and the drain electrode DE. The second insulating layer 12 is formed of, for example, a transparent inorganic insulating material such as silicon nitride, in the same manner as the first insulating layer.

A third insulating layer covering a portion of the second insulating layer 12 is formed on the second insulating layer 12. A third insulating layer 13 is formed of, for example, a light-transmitting organic insulating material such as an acrylic resin. The third insulating layer 13 has a film thickness greater than other insulating films formed of an inorganic material.

As illustrated in FIGS. 15, 16, and 17, some regions have the third insulating layer 13 while the other regions do not have the third insulating layer 13. As illustrated in FIGS. 16 and 17, the regions having the third insulating layer 13 are located over the scan lines GL and over the signal lines SL. The third insulating layer 13 has a grid shape that extends along the scanning lines GL and the signal lines SL and covers the scan lines GL and the signal lines SL. As illustrated in FIG. 15, the regions having the third insulating layer 13 are also located over the semiconductor layer SC, that is, over the switching elements Tr. As a result, the switching element Tr, the scan line GL, and the signal line SL are located at relatively long distances from the holding capacitance electrode IO, and are thereby less affected by a common potential from the holding capacitance electrode IO. In addition, regions on the array substrate 10 not having the third insulating layer 13 are provided in the regions surrounded by the scan lines GL and the signal lines SL. Thus, regions are provided in which the thickness of the insulating layer is less than the thickness of the insulating layer overlapping the signal lines SL and the scan lines GL in plan view. The regions surrounded by the scan lines GL and the signal lines SL have relatively higher optical transmittance than the regions over the scan lines GL and over the signal lines SL, whereby the light transmissivity is improved.

As illustrated in FIG. 15, a metal layer TM is provided on the third insulating layer 13. The conductive metal layer TM is wiring of a metal such as molybdenum (Mo) or aluminum (Al), a multilayered body of these metals, or an alloy thereof. As illustrated in FIG. 12, the metal layer TM is provided in a region overlapping the signal lines SL, the scan lines GL, and the switching elements Tr in plan view. With this configuration, the metal layer TM is formed into a grid shape, and openings AP surrounded by the metal layer TM are formed.

As illustrated in FIG. 15, the holding capacitance electrode IO is provided above the third insulating layer 13 and the metal layer TM. The holding capacitance electrode IO is formed of a light-transmitting conductive material such as indium tin oxide (ITO). The holding capacitance electrode IO is also called "third light-transmitting electrode". As illustrated in FIG. 11, the holding capacitance electrode IO has a region IOX including no light-transmitting conductive material in each of the regions surrounded by the scan lines GL and the signal lines SL. The holding capacitance electrode IO extends across the adjacent pixels Pix and is provided over the pixels Pix. A region of the holding capacitance electrode IO including the light-transmitting conductive material overlaps the scan line GL or the signal line SL, and extends to the adjacent pixel Pix.

The holding capacitance electrode IO has a grid shape that extends along the scanning lines GL and the signal lines SL and covers the scan lines GL and the signal lines SL. With this configuration, the holding capacitance HC between the region IOX including no light-transmitting conductive material and the pixel electrode PE is reduced. Therefore, the holding capacitance HC is adjusted by the size of the region IOX including no light-transmitting conductive material.

As illustrated in FIG. 12, the switching element Tr coupled to the scan line GL and the signal line SL is provided. At least the switching element Tr is covered with the third insulating layer 13 serving as an organic insulating layer, and the metal layer TM having a larger area than that of the switching element Tr is located above the third insulating layer 13. This configuration can reduce light leakage of the switching element Tr.

More specifically, the array substrate 10 includes the third insulating layer 13 serving as an organic insulating layer that covers at least the switching element Tr, and the metal layer TM that is provided on the third insulating layer 13 so as to overlap the third insulating layer 13, and has a larger area than that of the switching element Tr. The region surrounded by the scan lines GL and the signal lines SL has a region having a thickness less than that of the third insulating layer 13 that overlaps the scan lines GL and the signal lines SL in plan view. As a result, a slant surface along which the thickness of the third insulating layer 13 changes is formed on a side of the third insulating layer 13 closer, in plan view, to the light source 3 than the switching element Tr is. As illustrated in FIG. 5, the light-source light L emitted from the light source 3 is incident in the second direction PY serving as a direction of incidence. As illustrated in FIG. 15, the slant surfaces described above include a first slant surface 13F on a side of the third insulating layer 13 on which light Lu of the light-source light L is incident, and a second slant surface 13R on a side opposite the side on which the light Lu is incident. As illustrated in FIG. 15, a metal layer TMt covers the first slant surface 13F on the side of the third insulating layer 13 on which the light Lu is incident. The metal layer TMt is a tapered portion that is formed of the same material as that of the metal layer TM, and is formed by extending the metal layer TM.

As illustrated in FIG. 15, the light Lu arrives in the direction of incidence. The light Lu is part of the light-source light L that arrives from a side closer to the light source 3 than the switching element Tr is. The metal layer TMt blocks the light Lu, and thereby, reduces light leakage.

If the second slant surface 13R is covered with the metal layer TM and the background of the counter substrate 20 is viewed from the array substrate 10, light Ld2 viewed by the viewer is reflected by the metal layer TM covering the second slant surface 13R, and the reflected light may be visible to the viewer. In the first embodiment, no metal layer TM covers the second slant surface 13R. As a result, the display device of the first embodiment reduces the reflected light that hinders the vision of the viewer.

The metal layer TM may be located on the upper side of the holding capacitance electrode IO, and only needs to be stacked with the holding capacitance electrode IO. The metal layer TM has a lower electrical resistance than that of the holding capacitance electrode IO. Therefore, the potential of the holding capacitance electrode IO is restrained from varying with the position where the pixel Pix is located in the active region AA.

As illustrated in FIG. 12, the width of the metal layer TM overlapping the signal line SL is greater than that of the signal line SL in plan view. This configuration restrains reflected light reflected by edges of the signal line SL from being emitted from the display panel 2. The width of the metal layer TM and the width of the signal line SL are lengths in a direction intersecting the extending direction of the signal line SL. The width of the metal layer TM overlapping the scan line GL is larger than the width of the scan line GL. The width of the metal layer TM and the width of the scan line GL are lengths in a direction intersecting the extending direction of the scan line GL.

As illustrated in FIG. 15, a fourth insulating layer 14 is provided on the upper side of the holding capacitance electrode IO and the metal layer TM. The fourth insulating layer 14 is an inorganic insulating layer formed of, for example, a transparent inorganic insulating material such as silicon nitride.

As illustrated in FIG. 15, the pixel electrode PE is provided on the fourth insulating layer 14. The pixel electrode PE is formed of a light-transmitting conductive material such as ITO. The pixel electrode PE is electrically coupled to the contact electrode DEA through the contact hole CH provided in the fourth insulating layer 14, the third insulating layer 13, and the second insulating layer 12. As illustrated in FIG. 13, each of the pixel electrodes PE is separated from the others such that the pixel electrodes correspond to the pixels Pix on a one-to-one basis. The first orientation film AL1 is provided on the pixel electrode PE.

As illustrated in FIG. 15, the counter substrate 20 includes a second light-transmitting base member 29 formed of glass, for example. The material of the second light-transmitting base member 29 may be any material having a light transmitting property and may be, for example, a resin such as polyethylene terephthalate. The second light-transmitting base member 29 is provided with the common electrode CE. The common electrode CE is formed of a light-transmitting conductive material such as ITO. The second orientation film AL2 is provided on a surface of the common electrode CE. The counter substrate 20 includes a light-blocking layer LS between the second light-transmitting base member 29 and the common electrode CE. The light-blocking layer LS is formed of a resin or a metal material colored in black. A spacer PS is formed between the array substrate 10 and the counter substrate 20. The spacer PS is located between the common electrode CE and the second orientation film AL2.

As illustrated in FIGS. 12 and 16, in the display device of the first embodiment, a light-blocking layer GS located in the same layer as that of the scan line GL is provided in a position extending along the signal line SL and overlapping a portion of the signal line SL. The light-blocking layer GS is formed of the same material as that of the scan line GL. The light-blocking layer GS is not provided at a portion where the scan line GL intersects the signal line SL in plan view.

As illustrated in FIG. 12, the light-blocking layer GS is electrically coupled to the signal line SL through a contact hole CHG. With this configuration, the wiring resistance obtained by combining the light-blocking layer GS with the signal line SL is lower than that of only the signal line SL. As a result, the delay of the gradation signal supplied to the signal line SL is reduced. The contact hole CHG need not be provided, and the light-blocking layer GS need not be coupled to the signal line SL.

As illustrated in FIG. 16, the light-blocking layer GS is provided opposite the metal layer TM with the signal line SL therebetween. The width of the light-blocking layer GS is larger than that of the signal line SL and smaller than that of the metal layer TM. The width of the light-blocking layer GS, the width of the metal layer TM, and the width of the signal line SL are lengths in a direction intersecting the extending direction of the signal line SL. In this manner, the light-blocking layer GS has a larger width than that of the signal line SL, and thus, restrains the reflected light reflected by the edges of the signal line SL from being emitted from the display panel 2. As a result, the visibility of images is improved in the display device 1.

As illustrated in FIGS. 14 and 15, the counter substrate 20 is provided with the light-blocking layer LS. The light-blocking layer LS is provided in a region overlapping the signal lines SL, the scan lines GL, and the switching elements Tr in plan view.

As illustrated in FIGS. 14, 15, 16, and 17, the light-blocking layer LS has a larger width than that of the metal layer TM. This configuration restrains reflected light reflected by edges of the signal line SL, the scan line GL, and the metal layer TM from being emitted from the display panel 2. As a result, the visibility of images is improved in the display device 1.

The contact hole CH and the contact hole CHG are likely to diffusely reflect the light-source light L emitted thereto. Therefore, the light-blocking layer LS is provided in a region overlapping the contact holes CH and CHG in plan view.

As illustrated in FIG. 15, the spacer PS is disposed between the array substrate 10 and the counter substrate 20 and improves the uniformity of the distance between the array substrate 10 and the counter substrate 20.

Figure 18:
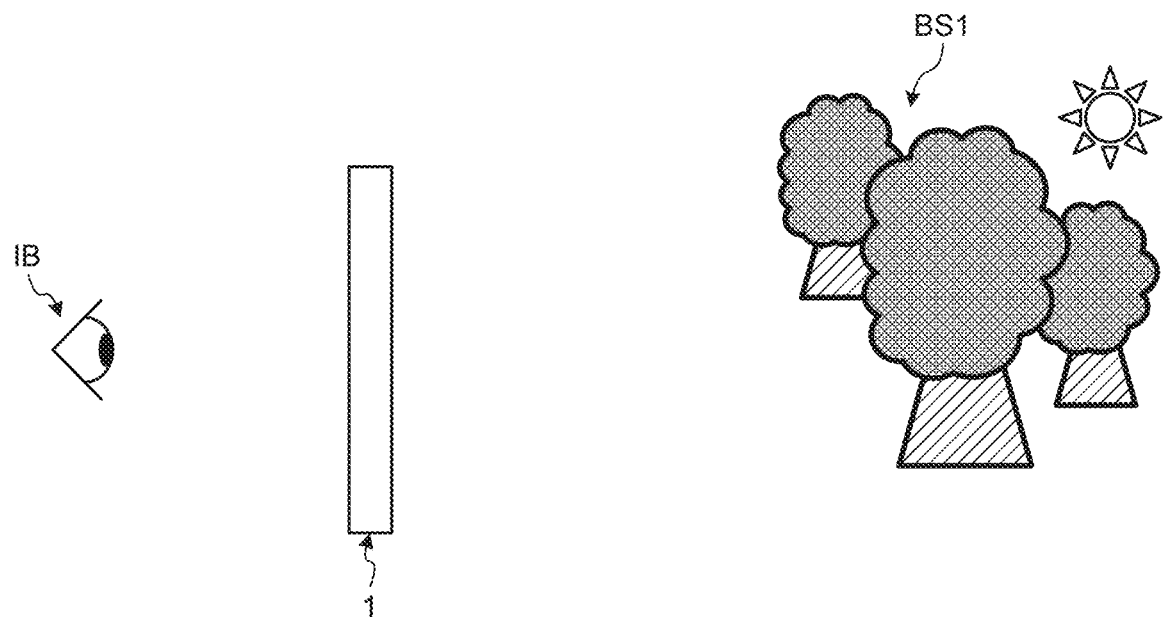
FIG. 18 is an explanatory diagram explaining a relation between a viewer and a background, the viewer viewing the background from one surface side, the background being located on the other surface side opposite to the one surface side.
Figure 19:
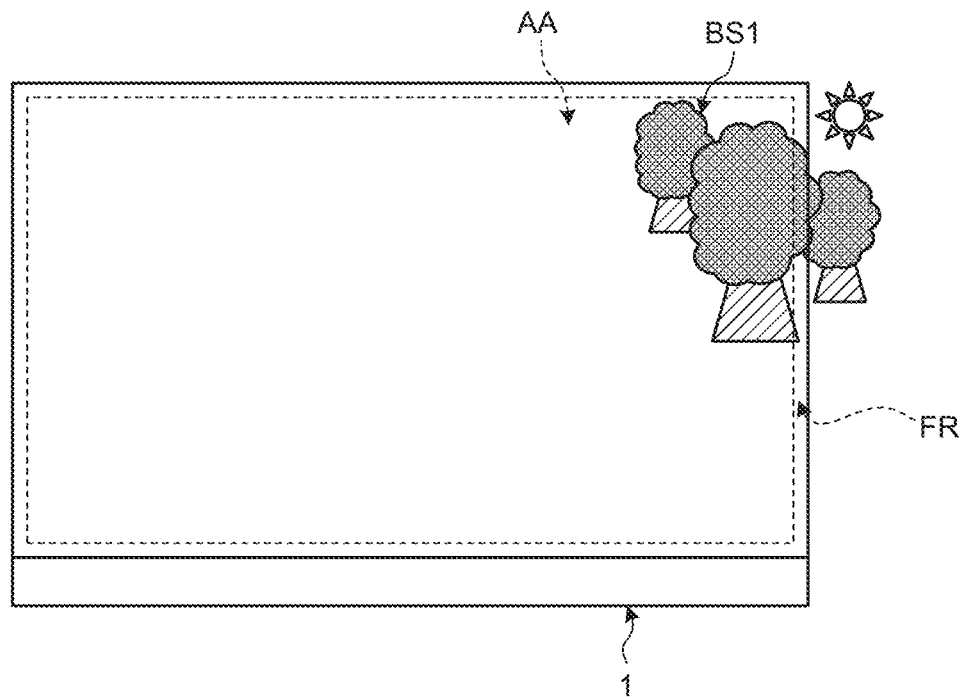
FIG. 19 is an explanatory diagram explaining an example in which a peripheral region overlaps the background.

FIG. 18 is an explanatory diagram explaining a relation between the viewer and the background, the viewer viewing the background from one surface side, the background being located on the other surface side opposite to the one surface side. FIG. 19 is an explanatory diagram explaining an example in which the peripheral region overlaps the background. As illustrated in FIG. 18, when a viewer IB views the other surface side of the display device 1 from the one surface side thereof, a background BS1 is viewed through the display device 1. As illustrated in FIG. 19, since the viewer IB can view the background BS1 through the active region AA, if the peripheral region FR outside the active region AA does not transmit light, the background BS1 is invisible and may cause a sense of discomfort. Therefore, so as to allow the viewer IB to view the background BS1 on the other surface side from the one surface side of the display device 1, the peripheral region FR is also made to allow light to pass therethrough to make the background BS1 visible, for example, by not forming the light-blocking layer LS that is to be formed on the counter substrate 20. By also making the peripheral region FR to be a transparent region in addition to the active region AA (display region), the aesthetics of the background are not compromised when viewed through the display device 1.

As described above, the display device 1 includes the display panel 2 and the light source 3. The display panel 2 includes the array substrate 10, the counter substrate 20, and the liquid crystal layer 50. The display panel 2 has the active region AA and the peripheral region FR outside the active region AA as viewed in a third direction PZ. The light source 3 includes the light guide 33L provided along the second side surface 20D of the counter substrate 20 and the second side surface 25D of the base member 25 and extending in the first direction PX, and the light emitters 31 arranged so as to face the light guide 33L.

Figure 20:
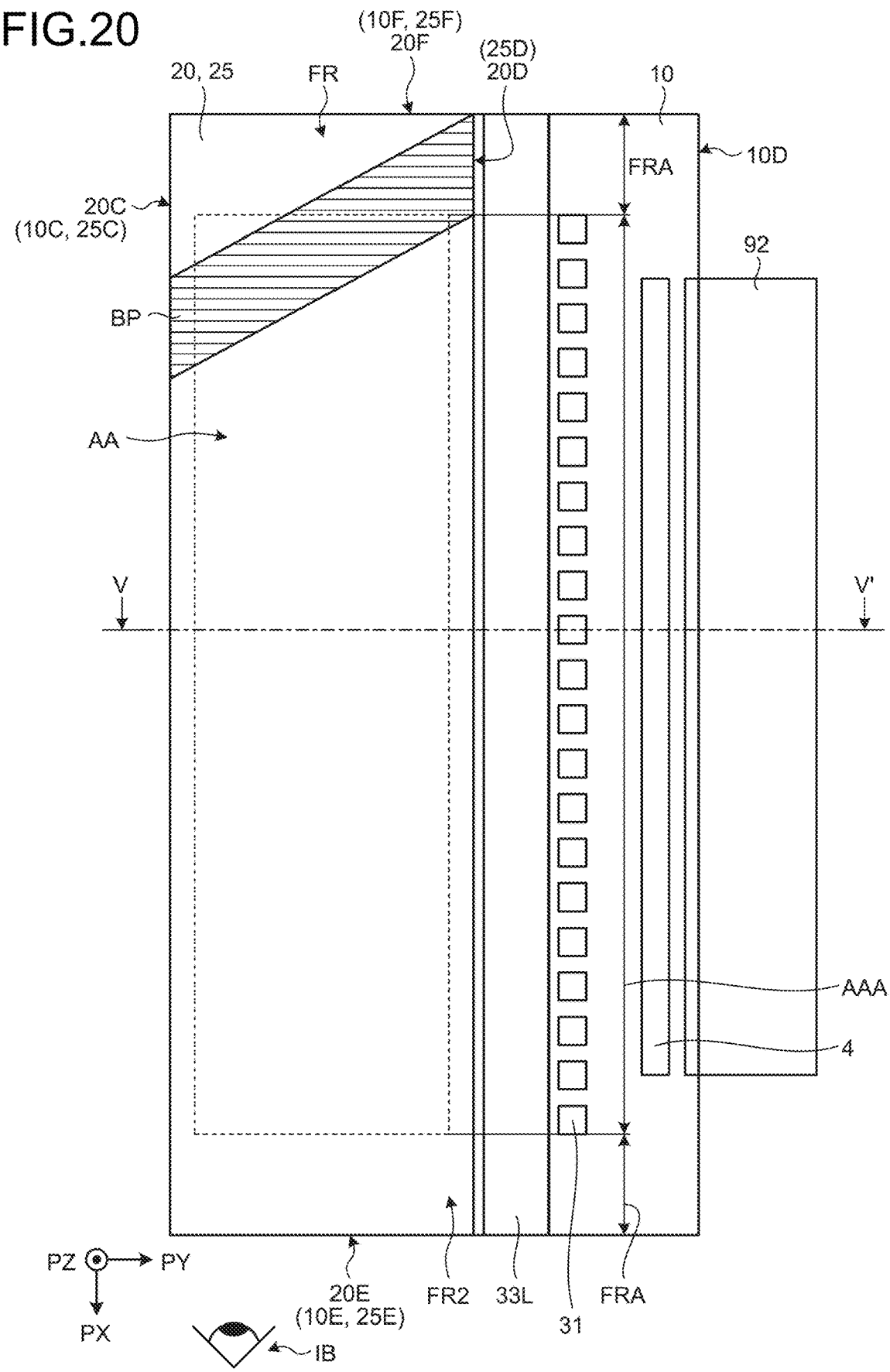
FIG. 20 is a plan view for explaining a display device of a comparative example.

FIG. 20 is a plan view for explaining a display device of a comparative example. As illustrated in FIG. 20, the light emitters 31 are arranged at intervals of the first pitch P1 in the second region AAA corresponding to the second direction PY of the active region AA. In the comparative example, the light emitters 31 are not arranged in the first region FRA corresponding to the peripheral region FR in the second direction PY. The second side surface 20D of the counter substrate 20 and the second side surface 25D of the base member 25 are irradiated with the light emitted by the light emitters 31 in the second region AAA, but not irradiated with the light emitted by the light emitters 31 in the first region FRA. Therefore, when the viewer IB views the display panel 2 at an angle to the normal direction of the display panel 2, an unintended shadow BP starting from the first region FRA corresponding to the peripheral region FR outside the active region AA may be visible.

In contrast, in the display device of the first embodiment, at least one of the light emitters 31 is disposed in each of the first regions FRA that overlap regions obtained by extending, in the second direction PY, the peripheral regions FR located on opposite sides in the first direction PX of the active region AA. With this configuration, the light from the light emitters 31 enters the second side surface 20D of the counter substrate 20 and the second side surface 25D of the base member 25 from the first regions FRA through the light guide 33L. Therefore, the shadow BP is difficult to be generated even when the viewer IB views the display panel 2 at an angle to the normal direction of the display panel 2.

The first pitch P1 of the adjacent light emitters 31 arranged in the second region AAA overlapping a region obtained by extending the active region AA in the second direction PY is smaller than the second pitch P2 of the adjacent light emitters 31 of the light emitters 31 arranged in the first region FRA. This configuration ensures a light quantity sufficient for eliminating the shadow BP and does not consume extra power.

Second Embodiment

Figure 21:
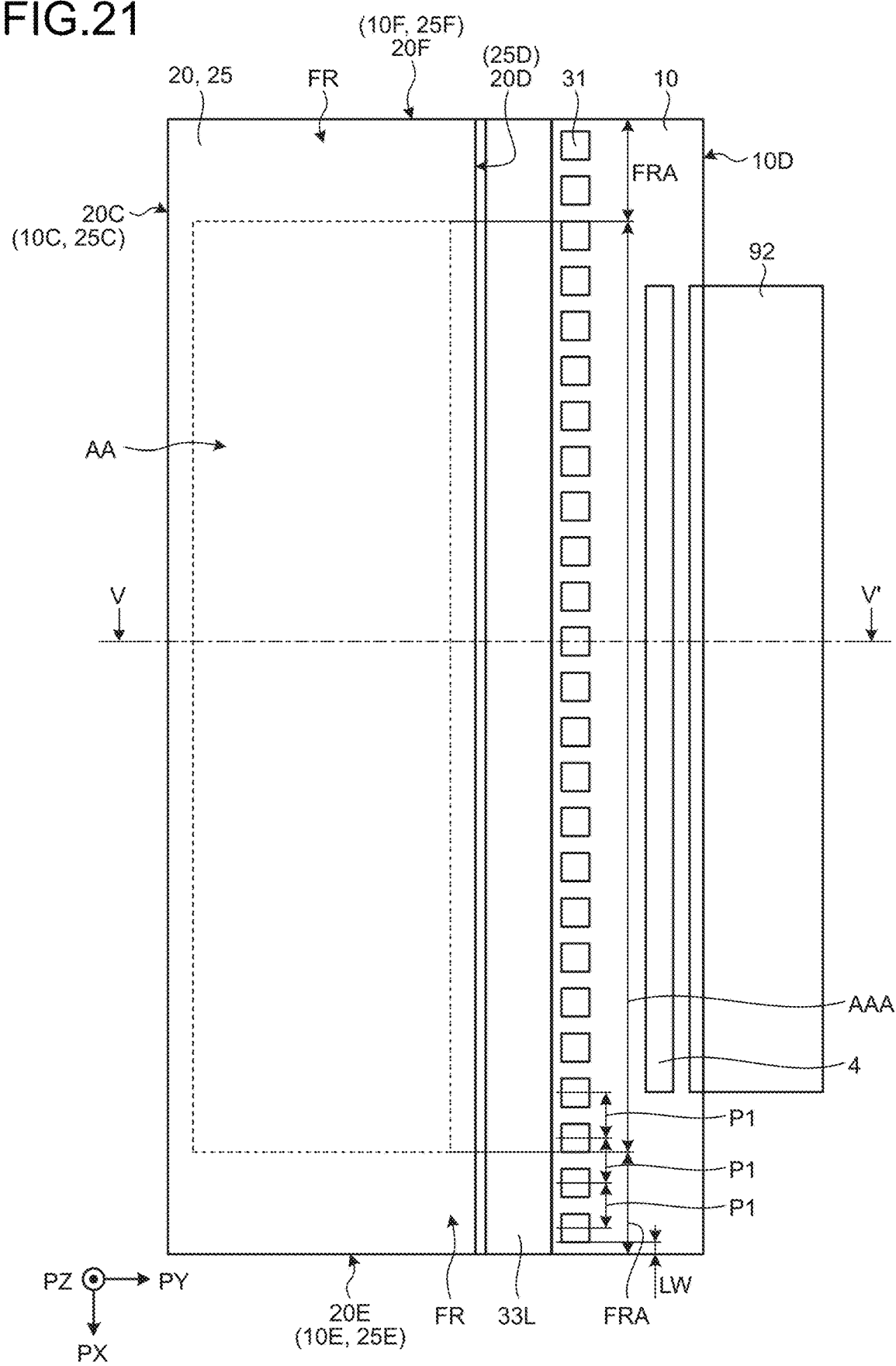
FIG. 21 is a plan view for explaining the display device according to a second embodiment of the present disclosure.

FIG. 21 is a plan view for explaining the display device according to a second embodiment of the present disclosure. The same components as those described in the embodiment above are denoted by the same reference numerals, and the description thereof will not be repeated.

As illustrated in FIG. 21, the first pitch P1 of the adjacent light emitters 31 of the light emitters 31 arranged in the first region FRA is the same as the first pitch P1 of the adjacent light emitters 31 arranged in the second region AAA. With this configuration, the same light quantity as that in the second region AAA is also ensured in the first region FRA, and the light quantity at the end in the first direction PX of the active region AA is ensured.

Third Embodiment

Figure 22:
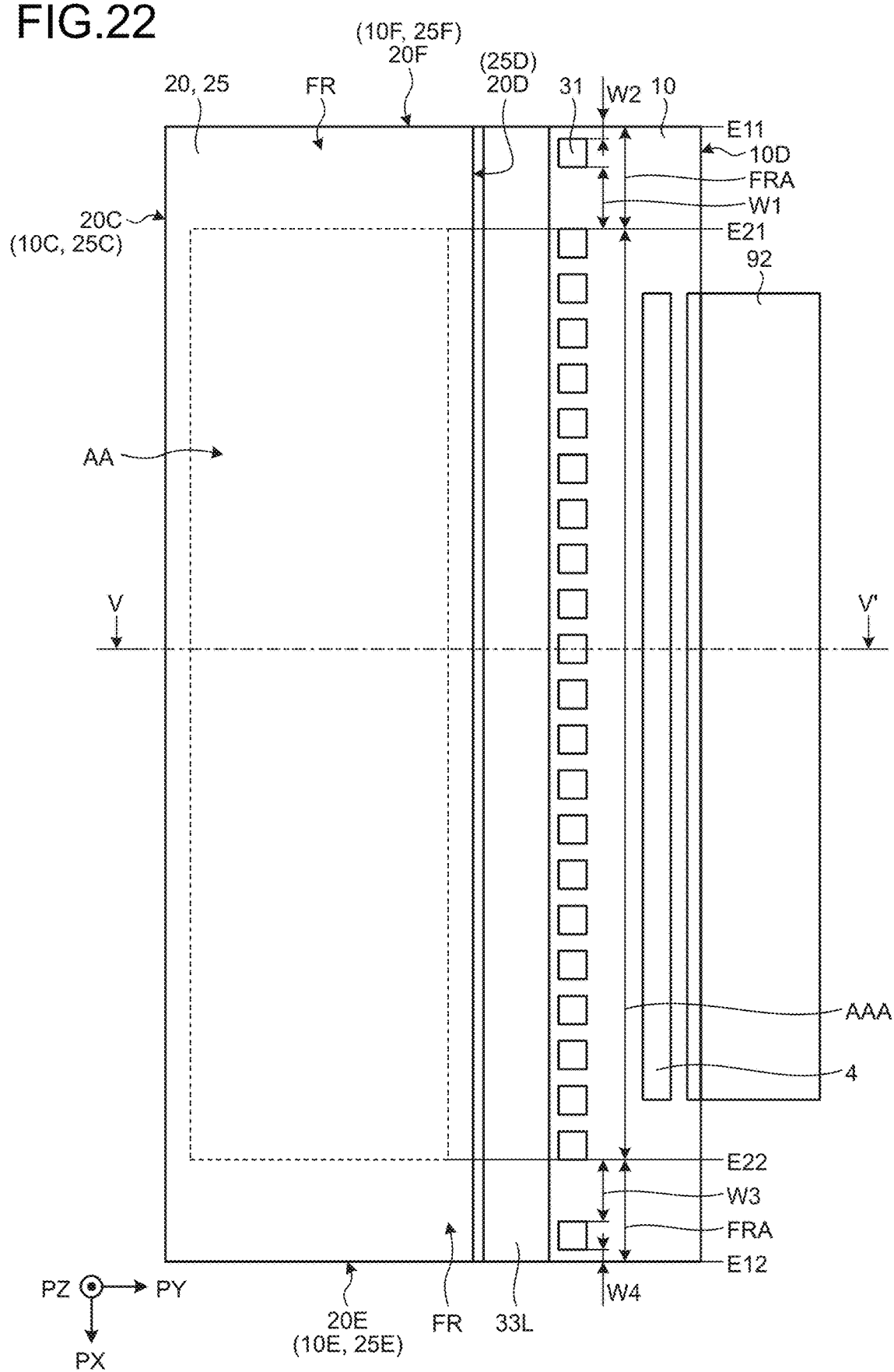
FIG. 22 is a plan view for explaining the display device according to a third embodiment of the present disclosure.

FIG. 22 is a plan view for explaining the display device according to a third embodiment of the present disclosure. The same components as those described in either one of the embodiments above are denoted by the same reference numerals, and the description thereof will not be repeated.

As illustrated in FIG. 22, in the third embodiment, one light emitter 31 is provided in each of the first regions FRA. A distance W1 from the light emitter 31 in one of the first regions FRA to a reference position E21 in the second region AAA closest to the light emitter 31 is larger than a distance W2 from the light emitter 31 in the one of the first regions FRA to the fourth side surface 20F in the first direction PX of the counter substrate 20.

A distance W3 from the light emitter 31 in the other of the first regions FRA to a reference position E22 in the second region AAA closest to the light emitter 31 is larger than a distance W4 from the light emitter 31 in the other of the first regions FRA to the third side surface 20E in the first direction PX of the counter substrate 20. With this configuration, even if the light emitters 31 are few, the shadow BP can be reduced using the reflection on the third side surface 20E or the fourth side surface 20F in the first direction PX of the counter substrate 20.

Fourth Embodiment

Figure 23:
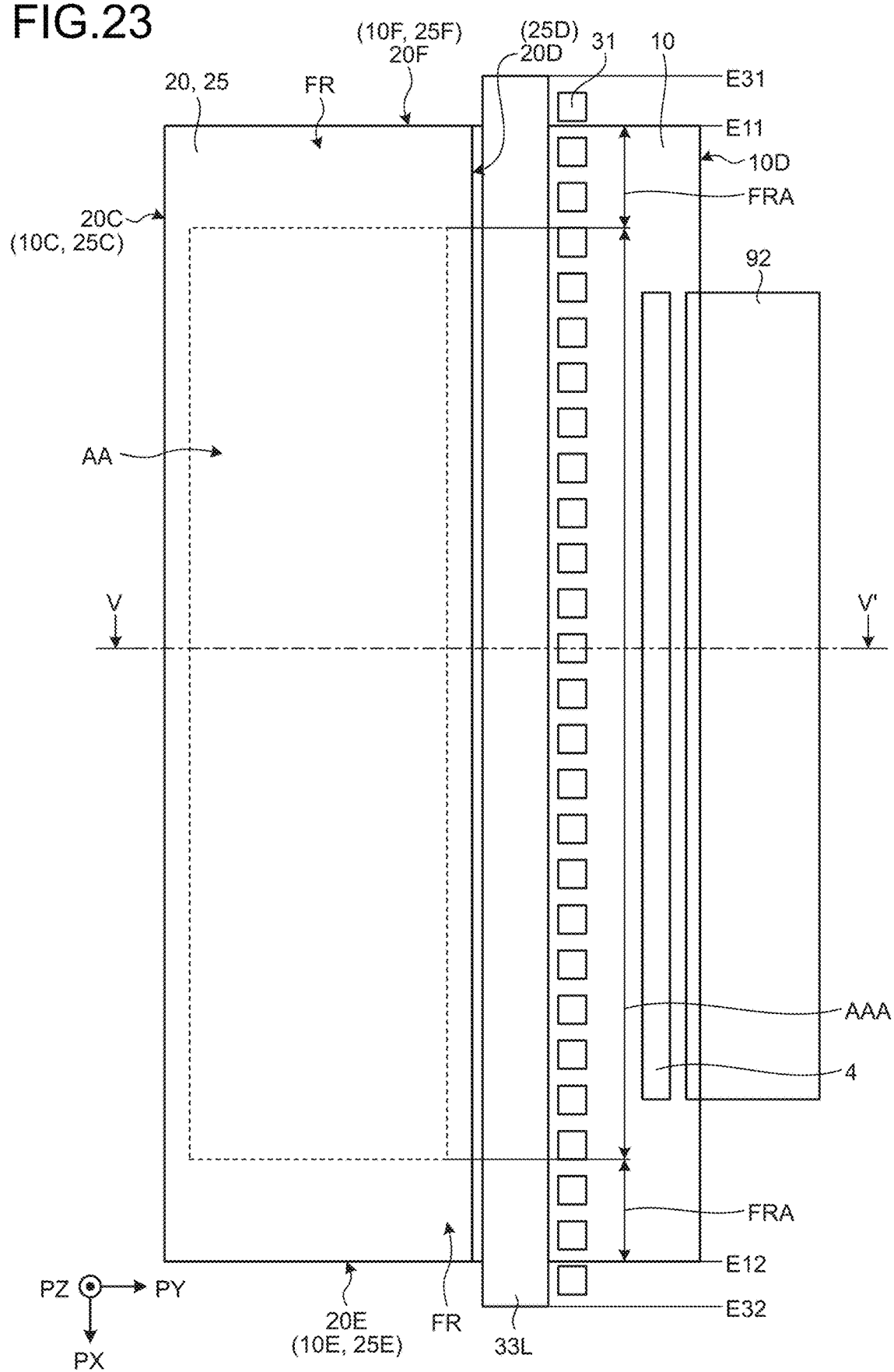
FIG. 23 is a plan view for explaining the display device according to a fourth embodiment of the present disclosure.

FIG. 23 is a plan view for explaining the display device according to a fourth embodiment of the present disclosure. The same components as those described in any one of the embodiments above are denoted by the same reference numerals, and the description thereof will not be repeated.

In the fourth embodiment, a side surface E31 or a side surface E32 in the first direction PX of the light guide 33L protrudes in the first direction PX more than a reference line E11 along the fourth side surface 20F or a reference line E12 along the third side surface 20E in the first direction PX of the counter substrate 20, respectively. The light emitter 31 is located in a position facing a portion protruding in the first direction PX more than the reference line E12 or the reference line E11. The light guide 33L simultaneously receives the light from the light emitters 31, internally diffuses the received light, and emits the diffused light to the display panel 2. Since at least two light emitters 31 adjacent to each other with the reference line E12 or the reference line E11 interposed therebetween are provided, the light quantity of the light guide 33L near the reference line E12 or E11 increases. As a result, the shadow BP described above becomes difficult to be generated.

Fifth Embodiment

Figure 24:
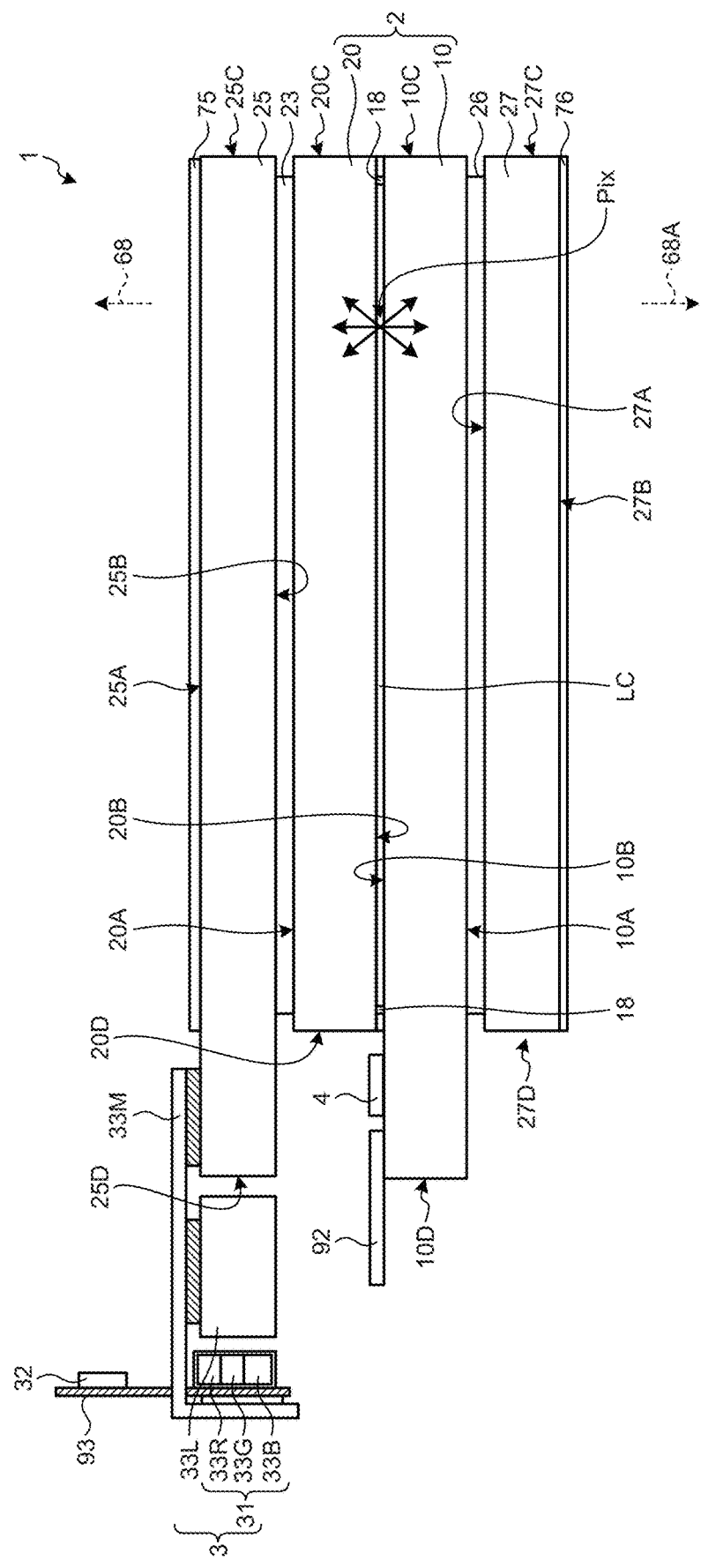
FIG. 24 is a sectional view illustrating an exemplary section of the display device according to a fifth embodiment of the present disclosure.

FIG. 24 is a sectional view illustrating an exemplary section of the display device according to a fifth embodiment of the present disclosure. The same components as those described in any one of the embodiments above are denoted by the same reference numerals, and the description thereof will not be repeated.

As illustrated in FIG. 24, the display device 1 includes the light-transmitting first base member 25, the display panel 2, and a light-transmitting second base member 27. The protective layer 75 is provided on one surface of the light-transmitting first base member 25. The protective layer 76 is provided on one surface of the light-transmitting second base member 27.

The second base member 27 is bonded to the second principal surface 10B of the array substrate 10 with an optical resin 26 interposed therebetween. The second base member 27 is a protective substrate for the array substrate 10 and is formed, for example, of glass or a light-transmitting resin. When the second base member 27 is a glass base member, it is also called a cover glass. When the second base member 27 is formed of a light-transmitting resin, it may be flexible.

The light source 3 includes the light guide 33L provided along the second side surface 25D of the first base member 25 extending in the first direction PX, and the light emitters 31 arranged so as to face the light guide 33L. In the fifth embodiment, unlike in the first embodiment, the light guide 33L does not face the second side surface 20D of the counter substrate 20 of the light source 3, but faces only the second side surface 25D of the first base member 25. In the light guide 33L, only the second side surface 25D of the first base member 25 serves as a plane of light incidence from the light source 3.

While the preferred embodiments have been described above, the present disclosure is not limited to such embodiments. The content disclosed in the embodiments is merely an example, and can be variously modified within the scope not departing from the gist of the present disclosure. Any modifications appropriately made within the scope not departing from the gist of the present disclosure also naturally belong to the technical scope of the present disclosure.

For example, the present disclosure has been described on the assumption that the switching element Tr has a bottom-gate structure, but the switching element Tr is not limited to the bottom-gate structure, and may have a top-gate structure. If the switching element Tr has a top-gate structure, the structure can be described as follows with reference to the insulating film stacking structure of FIG. 15: the semiconductor layer SC is disposed between the first light-transmitting base member 19 and the first insulating layer; the gate electrode GE is disposed between the first insulating layer 11 and the second insulating layer 12; and the source electrode SE and the contact electrode DEA are formed between the second insulating layer 12 and the third insulating layer 13.

In addition, a direct-current voltage may be supplied as the common potential. That is, the common potential may be constant. Alternatively, an alternating-current voltage may be supplied as the common potential. That is, the common potential may have two values of an upper limit value and a lower limit value. Whether the common potential is a direct-current potential or an alternating-current potential, the common potential is supplied to the holding capacitance electrode IO and the common electrode CE.

As for the third insulating layer 13 serving as a grid-shaped organic insulating film, the structure has been disclosed in which the third insulating layer 13 inside the grid-shaped region is totally removed to expose the second insulating layer 12 and the holding capacitance electrode IO in the lower layers. However, the present disclosure is not limited to this structure. For example, the structure may be obtained by using a halftone exposure technique to leave a thin film portion of the third insulating layer 13 inside the grid-shaped region surrounded by the signal lines SL and the scan lines GL. This structure reduces the thickness of the third insulating layer 13 inside the grid-shaped region to a thickness smaller than that of the grid-shaped region surrounded by the signal lines SL and the scanning lines GL.

What is claimed is:
1. A display device comprising:
 a display panel that comprises a first light-transmitting substrate, a second light-transmitting substrate, and a liquid crystal layer between the first light-transmitting substrate and the second light-transmitting substrate, and has an active region capable of displaying images as viewed from a direction orthogonal to the first light-transmitting substrate and peripheral regions outside the active region;
 a light-transmitting glass base member bonded to the display panel; and a light source disposed so that light enters a side surface of the first light-transmitting substrate, a side surface of the second light-transmitting substrate, or a side surface of the glass base member, wherein the light source comprises a light guide provided along the side surface of the first light-transmitting substrate, the side surface of the second light-transmitting substrate, or the side surface of the glass base member and extending in a first direction, and a plurality of light emitters arranged so as to face the light guide, at least one of the light emitters is disposed in each of first regions that overlap regions obtained by extending, in a second direction intersecting the first direction, the peripheral regions located on opposite sides in the first direction of the active region, and a first pitch of adjacent light emitters arranged in a second region overlapping a region obtained by extending the active region in the second direction is smaller than a second pitch of adjacent light emitters of the light emitters arranged in the first region.

2. The display device according to claim 1, wherein the light guide protrudes in the first direction more than a side surface in the first direction of the second light-transmitting substrate, and one of the light emitters is located in a position facing a portion protruding in the first direction more than the side surface in the first direction of the second light-transmitting substrate.

3. The display device according to claim 1, wherein, in the peripheral regions located on opposite sides in the first direction of the active region, a background of the second light-transmitting substrate is visible from the first light-transmitting substrate, and a background of the first light-transmitting substrate is visible from the second light-transmitting substrate.

4. The display device according to claim 1, wherein, in the active region, a background of the second light-transmitting substrate is visible from the first light-transmitting substrate, and a background of the first light-transmitting substrate is visible from the second light-transmitting substrate.

5. The display device according to claim 1, wherein the liquid crystal layer is polymer-dispersed liquid crystals, the first light-transmitting substrate has a first principal surface and a second principal surface that is a flat surface parallel to the first principal surface, the second light-transmitting substrate has a first principal surface and a second principal surface that is a flat surface parallel to the first principal surface, and when the polymer-dispersed liquid crystals are in a non-scattering state, a background on a first principal surface side of the second light-transmitting substrate is visible from the first principal surface of the first light-transmitting substrate, or a background on a first principal surface side of the first light-transmitting substrate is visible from the first principal surface of the second light-transmitting substrate.

6. A display device comprising:

a display panel that comprises a first light-transmitting substrate, a second light-transmitting substrate, and a liquid crystal layer between the first light-transmitting substrate and the second light-transmitting substrate, and has an active region capable of displaying images as viewed from a direction orthogonal to the first light-transmitting substrate and peripheral regions outside the active region;

a light-transmitting glass base member bonded to the display panel; and a light source disposed so that light enters a side surface of the first light-transmitting substrate, a side surface of the second light-transmitting substrate, or a side surface of the glass base member, wherein the light source comprises a light guide provided along the side surface of the first light-transmitting substrate, the side surface of the second light-transmitting substrate, or the side surface of the glass base member and extending in a first direction, and a plurality of light emitters arranged so as to face the light guide, at least one of the light emitters is disposed in each of first regions that overlap regions obtained by extending, in a second direction intersecting the first direction, the peripheral regions located on opposite sides in the first direction of the active region, more than one of the light emitters are arranged in a second region overlapping a region obtained by extending the active region in the second direction, one of the light emitters is provided in each of the first regions, and a distance from the one light emitter in the first region to a position of the second region closest to the one light emitter in the first region is larger than a distance from the one light emitter in the first region to a side surface in the first direction of the second light-transmitting substrate.

7. The display device according to claim 6, wherein the light guide protrudes in the first direction more than a side surface in the first direction of the second light-transmitting substrate, and one of the light emitters is located in a position facing a portion protruding in the first direction more than the side surface in the first direction of the second light-transmitting substrate.

8. The display device according to claim 6, wherein, in the peripheral regions located on opposite sides in the first direction of the active region, a background of the second light-transmitting substrate is visible from the first light-transmitting substrate, and a background of the first light-transmitting substrate is visible from the second light-transmitting substrate.

9. The display device according to claim 6, wherein, in the active region, a background of the second light-transmitting substrate is visible from the first light-transmitting substrate, and a background of the first light-transmitting substrate is visible from the second light-transmitting substrate.

10. The display device according to claim 6, wherein the liquid crystal layer is polymer-dispersed liquid crystals, the first light-transmitting substrate has a first principal surface and a second principal surface that is a flat surface parallel to the first principal surface, the second light-transmitting substrate has a first principal surface and a second principal surface that is a flat surface parallel to the first principal surface, and when the polymer-dispersed liquid crystals are in a non-scattering state, a background on a first principal surface side of the second light-transmitting substrate is visible from the first principal surface of the first light-transmitting substrate, or a background on a first principal surface side of the first light-transmitting substrate is visible from the first principal surface of the second light-transmitting substrate.

\* \* \* \* \*